(12) United States Patent
Jarvis

(10) Patent No.: US 11,224,265 B2
(45) Date of Patent: *Jan. 18, 2022

(54) ARTICLES AND METHODS OF MANUFACTURE OF ARTICLES

(71) Applicant: NIKE, Inc., Beaverton, OR (US)

(72) Inventor: Kelly B. Jarvis, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 51 days.

This patent is subject to a terminal disclaimer.

(21) Appl. No.: 16/855,260

(22) Filed: Apr. 22, 2020

(65) Prior Publication Data
US 2020/0245720 A1   Aug. 6, 2020

Related U.S. Application Data

(63) Continuation of application No. 15/418,822, filed on Jan. 30, 2017, now Pat. No. 10,681,961, which is a
(Continued)

(51) Int. Cl.
*B32B 37/00* (2006.01)
*A43B 13/41* (2006.01)
(Continued)

(52) U.S. Cl.
CPC ............. *A43B 13/41* (2013.01); *A43B 9/02* (2013.01); *A43B 9/12* (2013.01); *A43B 13/125* (2013.01);
(Continued)

(58) Field of Classification Search
USPC ...................................................... 12/146 B
See application file for complete search history.

(56) References Cited

U.S. PATENT DOCUMENTS

| 1,800,406 A | 4/1931 | Rice |
| 1,887,026 A | 11/1932 | Lach |

(Continued)

FOREIGN PATENT DOCUMENTS

| AU | 2008207351 A1 | 3/2009 |
| CN | 2048682 U | 12/1989 |

(Continued)

OTHER PUBLICATIONS

Webster's New Collegiate Dictionary, G. & C. Merriam Co., 1977, p. 927.
(Continued)

*Primary Examiner* — James D Sells
(74) *Attorney, Agent, or Firm* — Banner & Witcoff, Ltd.

(57) ABSTRACT

Various articles, such as footwear, apparel, athletic equipment, watchbands, and the like, and methods of forming those articles are presented. The articles are generally formed, in whole or in part, using rapid manufacturing techniques, such as laser sintering, stereolithography, solid deposition modeling, and the like. The use of rapid manufacturing allows for relatively economical and time efficient manufacture of customized articles. Portions of the articles may be manufactured using rapid manufacturing and those portions may be joined with portions formed using conventional, non-rapid manufacturing techniques. The methods may also include performing a scan of an appropriate body part of a user, such as a foot, in order to create a customized article of footwear for the user.

20 Claims, 12 Drawing Sheets

Related U.S. Application Data continuation of application No. 12/255,496, filed on Oct. 21, 2008, now Pat. No. 9,572,402.

(60) Provisional application No. 61/088,330, filed on Aug. 12, 2008, provisional application No. 60/982,047, filed on Oct. 23, 2007.

(51) Int. Cl.

| | | |
|---|---|---|
| *B29D 35/00* | (2010.01) | |
| *B33Y 80/00* | (2015.01) | |
| *A43B 23/02* | (2006.01) | |
| *A43D 1/02* | (2006.01) | |
| *B29C 64/00* | (2017.01) | |
| *B33Y 10/00* | (2015.01) | |
| *A43B 9/02* | (2006.01) | |
| *A43B 9/12* | (2006.01) | |
| *A43B 13/12* | (2006.01) | |
| *A43B 13/18* | (2006.01) | |
| *B29C 65/48* | (2006.01) | |
| *B29C 65/62* | (2006.01) | |
| *B29D 35/12* | (2010.01) | |
| *B29C 64/153* | (2017.01) | |
| *B29L 31/50* | (2006.01) | |

(52) U.S. Cl.
CPC .......... *A43B 13/181* (2013.01); *A43B 23/021* (2013.01); *A43B 23/0215* (2013.01); *A43B 23/0245* (2013.01); *A43D 1/025* (2013.01); *B29C 64/00* (2017.08); *B29C 65/48* (2013.01); *B29C 65/62* (2013.01); *B29D 35/00* (2013.01); *B29D 35/122* (2013.01); *B29D 35/126* (2013.01); *B33Y 10/00* (2014.12); *B33Y 80/00* (2014.12); *A43D 2200/60* (2013.01); *B29C 64/153* (2017.08); *B29L 2031/504* (2013.01); *B29L 2031/505* (2013.01)

(56) References Cited

U.S. PATENT DOCUMENTS

| | | |
|---|---|---|
| 2,288,388 A | 6/1942 | Bolten et al. |
| 3,256,621 A | 6/1966 | Linton |
| 3,921,313 A | 11/1975 | Mahide et al. |
| 4,134,955 A | 1/1979 | Hanrahan, Jr. et al. |
| 4,168,341 A | 9/1979 | Siedenstrang et al. |
| 4,219,945 A | 9/1980 | Rudy |
| D273,246 S | 4/1984 | Tonkel |
| 4,551,930 A | 11/1985 | Graham et al. |
| 4,598,487 A | 7/1986 | Misevich |
| 4,769,927 A | 9/1988 | Liggett et al. |
| 4,845,863 A | 7/1989 | Yung-Mao |
| 4,863,538 A | 9/1989 | Deckard |
| 4,938,816 A | 7/1990 | Beaman et al. |
| 4,968,816 A | 11/1990 | Imaki et al. |
| 5,156,697 A | 10/1992 | Bourell et al. |
| 5,233,767 A | 8/1993 | Kramer |
| 5,313,717 A | 5/1994 | Allen et al. |
| 5,348,693 A | 9/1994 | Taylor et al. |
| 5,367,791 A | 11/1994 | Gross et al. |
| 5,372,487 A | 12/1994 | Pekar |
| 5,408,761 A | 4/1995 | Gazzano |
| 5,421,050 A | 6/1995 | Laganas |
| 5,465,509 A | 11/1995 | Fuerst et al. |
| 5,511,323 A | 4/1996 | Dahlgren |
| 5,588,900 A | 12/1996 | Urakami |
| 5,619,809 A | 4/1997 | Sessa |
| 5,661,864 A | 9/1997 | Valiant et al. |
| 5,678,329 A | 10/1997 | Griffin et al. |
| 5,682,685 A | 11/1997 | Terlizzi |
| 5,686,167 A | 11/1997 | Rudy |
| 5,718,063 A | 2/1998 | Yamashita et al. |
| 5,771,610 A | 6/1998 | McDonald |
| 5,785,909 A | 7/1998 | Chang et al. |
| 5,876,767 A | 3/1999 | Mattes et al. |
| 5,908,569 A | 6/1999 | Wilkening et al. |
| 5,918,383 A | 7/1999 | Chee |
| 5,979,078 A | 11/1999 | McLaughlin |
| 5,987,780 A | 11/1999 | Lyden et al. |
| 5,987,781 A | 11/1999 | Pavesi et al. |
| 6,006,412 A | 12/1999 | Bergmann et al. |
| 6,029,376 A | 2/2000 | Cass |
| 6,061,929 A | 5/2000 | Ritter |
| 6,098,313 A | 8/2000 | Skaja |
| 6,108,943 A | 8/2000 | Hudson et al. |
| 6,110,411 A | 8/2000 | Clausen et al. |
| 6,180,943 B1 | 1/2001 | Lange |
| 6,193,923 B1 | 2/2001 | Leyden et al. |
| 6,195,914 B1 | 3/2001 | Otis |
| 6,259,962 B1 | 7/2001 | Gothait |
| 6,338,768 B1 | 1/2002 | Chi |
| 6,360,454 B1 | 3/2002 | Dachgruber et al. |
| 6,412,196 B1 | 7/2002 | Gross |
| 6,476,122 B1 | 11/2002 | Leyden |
| 6,533,885 B2 | 3/2003 | Davis et al. |
| 6,540,864 B1 | 4/2003 | Chi |
| 6,558,784 B1 | 5/2003 | Norton et al. |
| 6,574,523 B1 | 6/2003 | Hanna et al. |
| 6,589,471 B1 | 7/2003 | Khoshnevis |
| 6,589,630 B1 | 7/2003 | Crow |
| 6,601,042 B1 | 7/2003 | Lyden |
| 6,660,209 B2 | 12/2003 | Leyden et al. |
| 6,694,207 B2 | 2/2004 | Darrah et al. |
| 6,819,966 B1 | 11/2004 | Haeberli |
| 6,931,764 B2 | 8/2005 | Swigart et al. |
| 6,944,975 B2 | 9/2005 | Safdeye et al. |
| 6,971,193 B1 | 12/2005 | Potter et al. |
| 6,994,913 B1 | 2/2006 | Niki et al. |
| 7,065,820 B2 | 6/2006 | Meschter |
| 7,077,638 B2 | 7/2006 | Leyden et al. |
| 7,080,467 B2 | 7/2006 | Marvin et al. |
| RE39,354 E | 10/2006 | Dickens, Jr. et al. |
| 7,131,218 B2 | 11/2006 | Schindler |
| 7,148,266 B2 | 12/2006 | Nesbitt et al. |
| 7,148,286 B2 | 12/2006 | Baumann et al. |
| 7,171,765 B2 | 2/2007 | Lo |
| 7,200,955 B2 | 4/2007 | Foxen |
| 7,236,166 B2 | 6/2007 | Zinniel et al. |
| 7,291,002 B2 | 11/2007 | Russell et al. |
| 7,350,321 B2 | 4/2008 | Soon et al. |
| 7,398,608 B2 | 7/2008 | Schoenborn |
| 7,424,783 B2 | 9/2008 | Meschter et al. |
| 7,467,484 B2 | 12/2008 | Chang et al. |
| 7,636,974 B2 | 12/2009 | Meschter et al. |
| 7,779,558 B2 | 8/2010 | Nishiwaki et al. |
| 8,914,998 B2 | 12/2014 | Gheorghian et al. |
| 9,504,289 B2 | 11/2016 | Dojan et al. |
| 9,510,635 B2 | 12/2016 | Dojan et al. |
| 10,681,961 B2 * | 6/2020 | Jarvis .................. B29D 35/122 |
| 2001/0032399 A1 | 10/2001 | Litchfield et al. |
| 2001/0036516 A1 | 11/2001 | Schmidt |
| 2002/0023306 A1 | 2/2002 | Sajedi et al. |
| 2003/0009919 A1 | 1/2003 | Stein |
| 2003/0051372 A1 | 3/2003 | Lyden |
| 2003/0069807 A1 | 4/2003 | Lyden |
| 2003/0127436 A1 | 7/2003 | Darrah et al. |
| 2003/0172548 A1 | 9/2003 | Fuerst |
| 2003/0183324 A1 | 10/2003 | Tawney et al. |
| 2003/0191554 A1 | 10/2003 | Russell et al. |
| 2003/0233771 A1 | 12/2003 | Soon et al. |
| 2004/0104499 A1 | 6/2004 | Keller |
| 2004/0111920 A1 | 6/2004 | Cretinon |
| 2004/0118018 A1 | 6/2004 | Dua |
| 2004/0134099 A1 | 7/2004 | Jones et al. |
| 2004/0135292 A1 | 7/2004 | Coats et al. |
| 2004/0168329 A1 | 9/2004 | Ishimaru |
| 2004/0221482 A1 | 11/2004 | Berger et al. |
| 2004/0261295 A1 | 12/2004 | Meschter |
| 2005/0000116 A1 | 1/2005 | Snow |
| 2005/0017393 A1 | 1/2005 | Stockwell et al. |
| 2005/0039346 A1 | 2/2005 | Thomas et al. |

(56) References Cited

U.S. PATENT DOCUMENTS

| | | |
|---|---|---|
| 2005/0076536 A1 | 4/2005 | Hatfield et al. |
| 2005/0126038 A1 | 6/2005 | Skaja et al. |
| 2005/0151302 A1 | 7/2005 | Latos et al. |
| 2005/0188564 A1 | 9/2005 | Delgorgue et al. |
| 2005/0262739 A1 | 12/2005 | McDonald et al. |
| 2005/0268497 A1 | 12/2005 | Alfaro et al. |
| 2005/0282454 A1 | 12/2005 | Meschter et al. |
| 2006/0052892 A1 | 3/2006 | Matsushima et al. |
| 2006/0061012 A1 | 3/2006 | Hatfield et al. |
| 2006/0061613 A1 | 3/2006 | Fienup et al. |
| 2006/0064905 A1 | 3/2006 | Hudson et al. |
| 2006/0065499 A1 | 3/2006 | Smaldone et al. |
| 2006/0070260 A1 | 4/2006 | Cavanagh et al. |
| 2006/0112594 A1 | 6/2006 | Kilgore |
| 2006/0119012 A1 | 6/2006 | Ruatta et al. |
| 2006/0143839 A1 | 7/2006 | Fromme |
| 2006/0155417 A1 | 7/2006 | Cremaschi et al. |
| 2006/0283044 A1 | 12/2006 | Lacey |
| 2007/0016323 A1 | 1/2007 | Fried |
| 2007/0044345 A1 | 3/2007 | Yang |
| 2007/0045891 A1 | 3/2007 | Martinoni et al. |
| 2007/0056188 A1 | 3/2007 | Tsai |
| 2007/0119074 A1 | 5/2007 | Aveni et al. |
| 2007/0163147 A1 | 7/2007 | Cavanagh et al. |
| 2007/0182070 A1 | 8/2007 | Monsheimer et al. |
| 2007/0227041 A1 | 10/2007 | Menghini |
| 2007/0232753 A1 | 10/2007 | Monsheimer et al. |
| 2007/0277401 A1 | 12/2007 | Young-Chul |
| 2008/0155855 A1 | 7/2008 | Klavano |
| 2008/0215176 A1 | 9/2008 | Borovinskih et al. |
| 2008/0250673 A1 | 10/2008 | Andrews et al. |
| 2009/0014424 A1 | 1/2009 | Meschter |
| 2009/0072436 A1 | 3/2009 | Dean |
| 2009/0073162 A1 | 3/2009 | Waatti et al. |
| 2009/0316965 A1 | 12/2009 | Mailling et al. |
| 2011/0252664 A1 | 10/2011 | Jennings |

FOREIGN PATENT DOCUMENTS

| | | |
|---|---|---|
| CN | 1190560 A | 8/1998 |
| CN | 2357543 Y | 1/2000 |
| CN | 1252344 A | 5/2000 |
| CN | 1255887 A | 6/2000 |
| CN | 1342046 A | 3/2002 |
| CN | 1348731 A | 5/2002 |
| CN | 2676682 Y | 2/2005 |
| CN | 1638662 A | 7/2005 |
| CN | 1638663 A | 7/2005 |
| CN | 2827065 Y | 10/2006 |
| CN | 1871964 A | 12/2006 |
| CN | 1871965 A | 12/2006 |
| CN | 2857548 Y | 1/2007 |
| CN | 101161151 A | 4/2008 |
| CN | 101388119 A | 3/2009 |
| DE | 202004018209 U1 | 1/2005 |
| DE | 102005023473 A1 | 11/2006 |
| DE | 102006025990 A1 | 12/2006 |
| EP | 1206915 A2 | 5/2002 |
| EP | 1346655 A1 | 9/2003 |
| EP | 1354528 A1 | 10/2003 |
| GB | 1375665 A | 11/1974 |
| GB | 2188531 A | 10/1987 |
| GB | 2434541 A | 8/2007 |
| JP | 4419087 | 8/1969 |
| JP | S5692503 U | 7/1981 |
| JP | S60180511 U | 11/1985 |
| JP | 02107304 U | 8/1990 |
| JP | 3198801 | 8/1991 |
| JP | H0443109 U | 4/1992 |
| JP | H04505107 A | 9/1992 |
| JP | 06005506 U | 1/1994 |
| JP | 07007766 Y | 3/1995 |
| JP | 07030709 U | 6/1995 |
| JP | 3015346 U | 8/1995 |
| JP | 08197652 | 8/1996 |
| JP | H09010011 A | 1/1997 |
| JP | 09057874 | 3/1997 |
| JP | 09123315 | 5/1997 |
| JP | 09277384 A | 10/1997 |
| JP | H10240964 A | 9/1998 |
| JP | 2000152801 A | 6/2000 |
| JP | 2002001827 A | 1/2002 |
| JP | 03316462 B2 | 8/2002 |
| JP | 2004042545 A | 2/2004 |
| JP | 3107284 U | 1/2005 |
| JP | 2006072837 A | 3/2006 |
| JP | 2006265545 A | 10/2006 |
| JP | 2006334400 A | 12/2006 |
| JP | 2007522908 A | 8/2007 |
| JP | 2008513252 A | 5/2008 |
| JP | 2008517795 A | 5/2008 |
| JP | 4112321 B2 | 7/2008 |
| JP | 2009045244 A | 3/2009 |
| KR | 1019940003504 | 3/1994 |
| KR | 200412036 Y1 | 3/2006 |
| WO | 20000053398 A1 | 9/2000 |
| WO | 03082550 A2 | 10/2003 |
| WO | 2005063071 A2 | 7/2005 |
| WO | 2006034012 A2 | 3/2006 |
| WO | 2006034261 A2 | 3/2006 |
| WO | 2006038338 A1 | 4/2006 |
| WO | 2006122832 A2 | 11/2006 |
| WO | 2009035831 A1 | 3/2009 |
| WO | 2009055451 A1 | 4/2009 |
| WO | 2009114715 A2 | 9/2009 |

OTHER PUBLICATIONS

International Search Report and Written Opinion received in corresponding PCT Application No. PCT/US2010/030746 dated Jul. 30, 2010.

International Search Report and Written Opinion received in corresponding PCT Application No. PCT/US2008/080761 dated Mar. 25, 2009.

News Releases, Reebok Runs With 3D Systems' DuraForm Flex Plastic, http:/www.3dsystems.com/newsevents/newsreleases/pr-Oct 8 2007.asp, printed off internet prior to filing.

DuraForm Flex plastic, http://www.approto.com/EasyOnline/pds/DS-DuraForm_Flex_plastic.pdf, dated Jun. 1, 2005.

University of the Arts London, http://www.fashion.arts.ac.uk/15144.htm, printed off internet prior to filing.

Manufacturingtalk, Shoe-Industry specific VISI—Shoes software, http:www.manufacturingtalk.com/news/vea/vea101.html, dated Nov. 18, 2005.

Loughborough University, PhD Studentships, http://www.jobs.ac.uk/jobs/NL338/PhD_Studentships/, dated 2008.

E-Manufacturing Solutions, Target: Plastic Parts, http://www.complexmatters.com/news.htm, printed off internet prior to filing.

International Search Report for application No. PCT/US2010/030748 dated Jan. 18, 2011.

PCT/US2008/080761, Preliminary Report on Patentability and Written Opinion, dated May 6, 2010.

Computersight.com, "A 3D Printer Lets You Print Your Shoes at Home", available at http://computersight.com/computers/a-3d-printer-lets-you-print-your-shoes-at-home/, published on-line Dec. 4, 2006, 6 pages.

IET Faraday: Custom Made Sports Shoes (Rapid Manufacturing), Nov. 10, 2008 (Nov. 10, 2008), XP002690443, Retrieved from the Internet: URL:www.youtube.com/watch?v=gFSiZgrdCZM [retrieved on Jan. 16, 2013] * the whole document *.

Cadalyst, "On the Job: 3D Printing Gives Footwear Company Leg Up on Competition", available at http://www.zcorp.com/documents/161_2006-0210-Cadalyst-3D%20Printing%20Gives%20Footwear%20Co.%20Leg%20Up%20on%20Competition.pdf, Feb. 10, 2006, 3 pages.

Graham-Rowe, Duncan, "Tailor-printed shoes will offer a perfect fit", New Scientist, Feb. 11, 2006, vol. 189, Issue 2538, p. 30 (3 pages as printed).

(56) References Cited

OTHER PUBLICATIONS

Piller, Frank T., "Footwear Customization 3.0: The First Rapid Manufactured Shoe", Oct. 24, 2006 (Oct. 24, 2006), XP002690441, Retrieved from the Internet: URL:http://mass-customization.blogs.com/mass_customization_open_i/2006/10/footwear_custom.html [retrieved on Jan. 16, 2013] * the whole document *.

Pillar, Frank, "Footwear Customization 3.0: The First Rapid Manufactured Shoe", Mass Customization & Open Innovation News, published on-line Oct. 24, 2006 at http://mass-customization.blogs.com/mass_customization_open_i2006/10/footwear_custom.html, 4 pages.

Loughborough University: "World's first fully customised football boot accelerated by Rapid Manufacturing experts", Apr. 7, 2006 (Apr. 7, 2006), XP002690442, Retrieved from the Internet: URL:http://www.lboro.ac.uk/service/publicity/news-releases/2006/25_sintering.html [retrieved on Jan. 16, 2013] * the whole document *.

"Custom Made Sports Shoes (Rapid Manufacturing)—YouTube", downloaded from https://www.youtube.com/watch?v=gFSiZgrdCZM.

Mass Customization & Open Innovation News, "Prior 2 Lever: Footwear Customization With Rapid Manufacturing", downloaded from <http://mass-customization.de/2006/04/prior_2_lever_f.html>.

J.P. Kruth et al. "Consolidation of Polymer Powders by Selective Laser Stintering," 3rd International Conference PMI2008 (2008). Ghent. Belgium, pp. 1-16.

Oct. 16, 2018—(EP) ESR—App. No. 18182995.3.

Zhang, Yu, "Mechanical Property of Fused Deposition Parts," Graduate Thesis, Lehigh University, Lehigh Preserve, 2002.

Wohlers, Terry, "The World of Rapid Prototyping," published in the Proceedings of the Fourth International Conference on Desktop Manufacturing, Sep. 24-25, 1992, San Jose, CA, and available at https://wohlersassociates.com/mrhtml.

Major RP Technologies, available at https://uni.edu/~rao/rt.major_tech.htm.

Elkins, Kurt, et al., "Soft Elastomers for Fused Deposition Modeling", Solid Freeform Fabrication Proceedings, Sep. 1997, pp. 441-448 (Year 1997).

Apr. 3, 2020—U.S. Final Office Action—U.S. Appl. No. 15/788,884.
Apr. 3, 2020—U.S. Notice of Allowance—U.S. Appl. No. 15/888,304.
Aug. 6, 2020—(EP) ESR—App. No. 20159387.8.

* cited by examiner

ARTICLES AND METHODS OF MANUFACTURE OF ARTICLES

CROSS REFERENCE TO RELATED APPLICATIONS

This application is a continuation of U.S. patent application Ser. No. 15/418,822 filed Jan. 30, 2017, which application is a continuation of U.S. patent application Ser. No. 12/255,496 filed Oct. 21, 2008 (now U.S. Pat. No. 9,572,402 B2 granted Feb. 21, 2017), which application further claims priority to: (a) U.S. Provisional Application No. 60/982,047 filed Oct. 23, 2007 and entitled "Articles and Method of Manufacturing Articles" and (b) U.S. Provisional Application No. 61/088,330 filed Aug. 12, 2008 and entitled "Articles and Method of Manufacture of Articles." Each of U.S. patent application Ser. No. 15/418,822, U.S. patent application Ser. No. 12/255,496, U.S. Provisional Application No. 60/982,047, and U.S. Provisional Application No. 61/088,330 is incorporated by reference herein in their entirety.

FIELD OF THE INVENTION

This invention relates generally to wearable articles and methods for the manufacture of these articles. More particularly, aspects of this invention relate to articles such as footwear, including outsoles, midsoles, uppers, heel counters, etc.; watchbands; jewelry; athletic equipment, such as shin guards, hockey sticks, chest protectors, face masks, golf equipment; and the like, as well as methods of manufacturing these articles using rapid manufacturing technology.

BACKGROUND

Various manufacturing processes exist to form a variety of manufactured articles, such as articles of footwear, apparel, athletic equipment, and the like. For example, a midsole for an article of footwear may be manufactured using one of a number of commonly used molding techniques, such as injection molding, blow molding, compression molding, vacuum molding, and the like. These molding methods often require expensive molding equipment that allows little room for variation in the articles produced from the mold. For instance, each size may require production of a new mold tailored to that specific size. Additionally, any change to the design of the molded article generally would require the creation of a new mold. These manufacturing methods generally require a costly retooling anytime a change was made to the molded article design. In addition, molding processes often result in material waste as some material may be trimmed from the molded article in a post-manufacturing processing step.

In addition, conventional molding and article manufacturing methods often leave little or no ability to customize the article, such as an article of footwear, to the particular needs or desires of the wearer. That is, conventional articles of footwear, apparel, athletic equipment, etc. are often mass produced. While some articles are produced in varying sizes, articles are rarely manufactured to the specifications of one particular user due to the excessive expense involved in such customization.

SUMMARY

The following presents a general summary of aspects of the invention in order to provide a basic understanding of the invention and various features of it. This summary is not intended to limit the scope of the invention in any way, but it simply provides a general overview and context for the more detailed description that follows.

Aspects of this invention relate to articles, such as footwear, watchbands, articles of apparel, athletic equipment, and the like. In addition, aspects of this invention relate to methods of manufacturing such articles using rapid manufacturing additive fabrication techniques. In some arrangements, all or some part of an article of footwear is formed. The article of footwear may include an upper that can be formed using rapid manufacturing techniques, and this upper can then be joined to a sole structure. In some examples, the sole structure may be formed using conventional, non-rapid manufacturing techniques.

In addition, the sole structure of the article of footwear may be formed using rapid manufacturing techniques. The sole structure may then be joined to an upper formed from a rapid manufacturing technique, or to an upper formed from a conventional, non-rapid manufacturing technique.

In some arrangements, a scan is performed of the foot of the wearer to determine various physical characteristics of the foot. The article of footwear then may be formed, using rapid manufacturing techniques, to conform the article of footwear to better match the physical characteristics of the user's foot obtained via the scan. Such an arrangement provides for customization of the article of footwear to the specifications of a particular user. Additionally or alternatively, if desired, the use of rapid manufacturing additive fabrication techniques can be used to allow a user or other designer to incorporate any desired design features into the structure of the footwear (or other object to be produced).

BRIEF DESCRIPTION OF THE DRAWINGS

A more complete understanding of the present invention and certain advantages thereof may be acquired by referring to the following detailed description in consideration with the accompanying drawings, in which.

Figure 1:
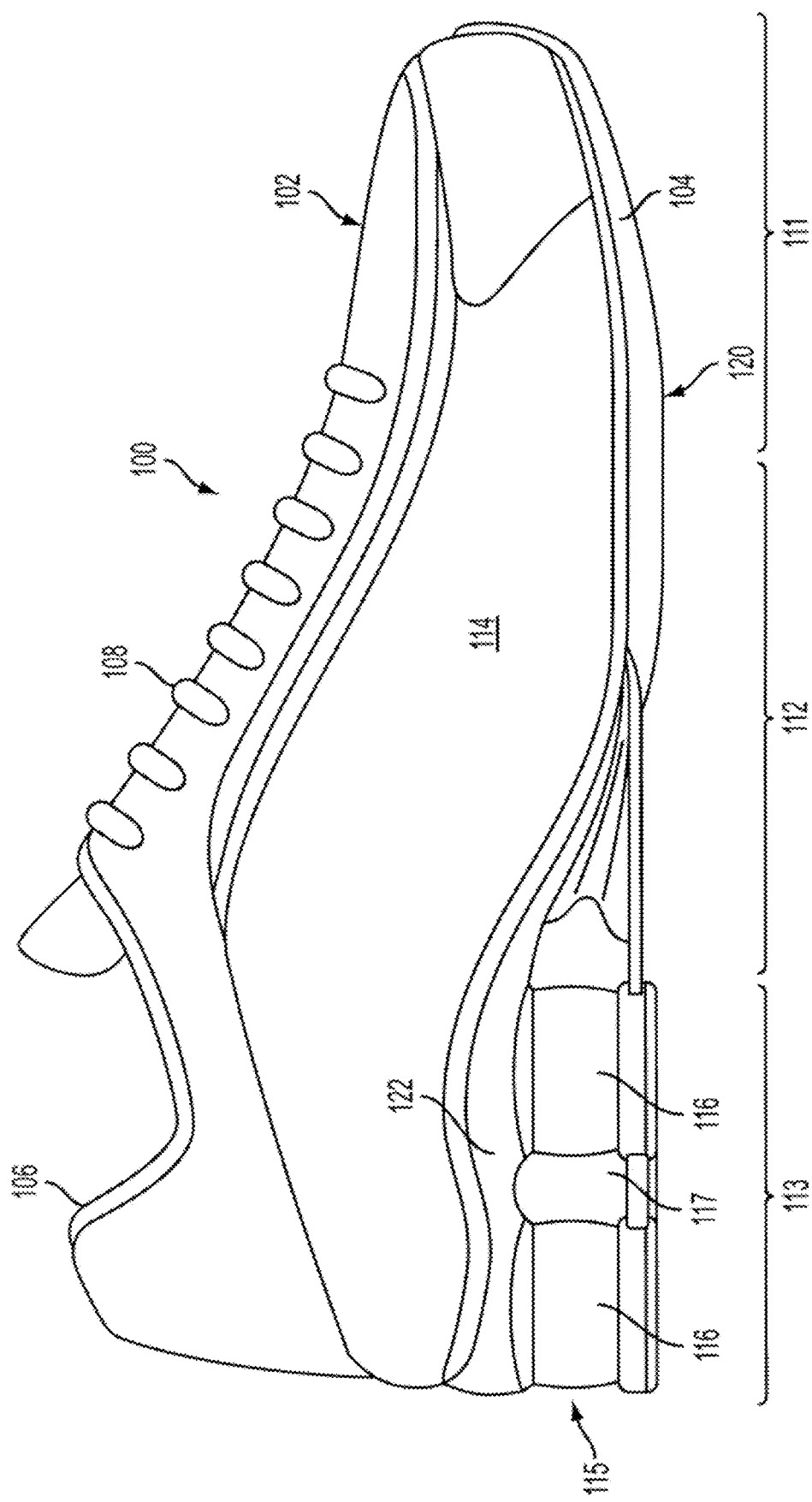
FIG. 1 generally illustrates a side view of an example article of footwear formed according to this invention.

The reader is advised that the attached drawings are not necessarily drawn to scale.

DETAILED DESCRIPTION

In the following description of various example structures in accordance with the invention, reference is made to the accompanying drawings, which form a part hereof, and in which are shown by way of illustration various example articles and methods for manufacturing these articles, such as footwear, watchbands, apparel, athletic equipment, and the like. Additionally, it is to be understood that other specific arrangements of parts and structures may be utilized, and structural and functional modifications may be made without departing from the scope of the present invention. Also, while the terms "top," "bottom," "front," "back," "rear," "side," "underside," "overhead," and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention. Further, the invention will generally be described in accordance with an article of footwear and method of manufacturing an article of footwear. However, the invention may be used in accordance with a variety of articles and nothing in the specification or figures should be construed to limit the invention to articles of footwear.

A. General Description of Articles and Method for Manufacture of Articles, Such as Footwear, Watchbands, Apparel, Athletic Equipment, and the Like, According to Examples of the Invention In general, as described above, aspects of this invention relate to articles, such as footwear, watchbands, articles of apparel (e.g., pants, shirts, outerwear, etc.), athletic equipment (e.g., hockey sticks, goalie masks, football helmets, shin guards, lacrosse sticks, etc.), and the like. In addition, aspects of this invention relate to methods of manufacturing such articles. More detailed descriptions of aspects of this invention follow.

1. Example Articles, Such as Articles of Footwear, Watchbands, Apparel, Athletic Equipment, and the Like, According to the Invention One aspect of this invention relates to articles of manufacture, such as apparel, athletic equipment, and the like. In some more specific examples, aspects of this invention relate to articles of footwear. Such articles of footwear may include, for example, an upper and a sole structure engaged with the upper. In at least some examples, the upper and sole structure may be formed using a rapid manufacturing technique, such as laser sintering, solid deposition modeling, stereolithography, and the like. The upper and sole structure may be integrally formed as a single piece. Alternatively, the upper and sole structure may be formed separately and may be connected using any known means for connecting, such as stitching, adhesively bonding, mechanical connectors or fasteners, and the like. The upper and sole structure may be formed of substantially the same or similar materials or different materials. However, each material used is generally flexible to allow for proper function of the article of footwear.

In other examples, the upper may be formed using a rapid manufacturing technique, such as those described above. The upper may be formed as a single piece or as a plurality of upper portions that are joined together. In these arrangements, the upper may be engaged with a conventional sole structure, such as a sole structure formed using a non-rapid manufacturing technique. Such techniques may include various types of molding, such as injection molding, compression molding, blow molding, vacuum molding, and the like. The conventional sole structure may include any known midsole impact force attenuation system to absorb the force of the foot hitting the ground during walking, running, etc. Such midsole impact force attenuation systems generally may include column type impact force attenuation systems, foam core impact force attenuation systems, fluid-filled bladder impact force attenuation systems, etc. Once the upper is formed using a rapid manufacturing technique, the upper may undergo additional processing, for example painting, to provide a desired appearance.

In still other examples, the upper may be a conventional upper (e.g., formed of leather, textiles, polymeric materials, etc.). That is, the upper may be formed from a non-rapid manufacturing technique. The conventional upper may be engaged with a sole structure formed using a rapid manufacturing technique. The sole structure generally includes a midsole having a midsole impact force attenuation system and an outsole. The midsole and outsole may be integrally formed as a single piece or may be formed separately. The midsole impact force attenuation system may be a column type impact force attenuation system, foam core impact force attenuation system, fluid-filled bladder impact force attenuation system, and the like. In addition, the use of rapid manufacturing in forming the sole structure allows for complex designs to be formed. For instance, the sole structure may include a midsole impact force attenuation type comprised of a plurality of interlocking links.

Still further example articles may include articles of footwear wherein the upper is formed using a rapid manufacturing technique, and the sole structure is also formed using a rapid manufacturing technique. The upper and sole structure are then engaged using any known method, such as stitching, adhesively bonding, mechanical connectors or fasteners, etc. In some examples, the upper and sole structure are formed using the same rapid manufacturing technique, optionally, as a unitary, one piece construction. However, if desired, the upper may be formed using a rapid manufacturing technique different from the rapid manufacturing technique used to form the sole structure.

Additional aspects of the articles described above will be described in detail more fully below.

2. Example Methods of Manufacturing Articles, Such as Articles of Footwear, Apparel, Athletic Equipment, and Watchbands According to the Invention Another aspect of this invention relates to methods of manufacturing articles, such as apparel, athletic equipment, footwear, and the like. Such methods of manufacturing articles of footwear include forming an upper, forming a sole structure and engaging the upper with the sole structure. In some examples, the sole structure and the upper may be formed using rapid manufacturing additive fabrication techniques, such as laser sintering, stereolithography, solid deposition modeling, and the like. The upper may be formed as a single piece or as a plurality of portions joined together. In addition, the upper may be formed to include texture during the rapid manufacturing process. In addition, the upper and sole structure may be integrally formed as a single piece. Alternatively, the upper and sole structure may be formed separately and joined using known means of joining, such as stitching, adhesive bonding, mechanical connectors or fasteners, and the like.

In other examples, the upper may be formed using a rapid manufacturing technique, while the sole structure is formed from a non-rapid manufacturing technique. The upper may be joined with the conventional sole structure using known means of joining, such as those described above. In addition, the upper may include texture formed during the rapid manufacturing process. The upper may also include one or more post manufacturing processing steps. For instance, the upper may be painted to obtain a desired appearance.

In still other examples, the upper may be formed from conventional methods of manufacturing (i.e., non-rapid manufacturing techniques) while the sole structure is formed from a rapid manufacturing technique. In such examples, the sole structure may be joined with the upper using methods described above. If desired, multiple portions of the sole structure may be formed as a single piece. For example, the midsole and outsole of the sole structure may be integrally formed as a single piece. Alternatively, the portions of the sole structure may be formed as separate pieces (by rapid manufacturing or other techniques) and joined together. The sole structure is generally formed with an midsole impact force attenuation system formed in the midsole. If desired, in addition to or as an alternative to impact attenuating systems formed by rapid manufacturing techniques, the midsole impact force attenuation system may include one or more of several impact force attenuation types, such as fluid-filled bladders, column type elements, foam cores, and the like. In addition, the use of rapid manufacturing to form the midsole impact force attenuation system permits manufacture of complex impact force attenuation designs. For instance, the midsole impact force attenuation system may include a plurality of interlocking links.

In some examples, the article of footwear may be formed from a scan of the foot of the user. For instance, a scan may be performed on the foot of the user to determine various physical characteristics of the user's foot. A design file, such as a computer aided design (CAD) file, may be created from the scan. The design file generally includes a three-dimensional design of the article of footwear designed based upon the results of the scan. The upper and sole structure are then formed based on the design file using a rapid manufacturing technique. This method allows for customization of the article of footwear to fit the size and dimension of the particular user's foot. Systems used for such scanning are generally known in the art. For example, U.S. Pat. No. 5,880,961 to Crump describes one such method and is incorporated herein by reference.

Other examples of methods of manufacture include manufacturing other articles, such as athletic equipment, articles of apparel, watchbands, and the like. Such methods may include performing a scan of the appropriate body part of the user. For instance, a scan of a user's lower leg may be performed when manufacturing a shin guard according to aspects of the invention. Once the scan is performed, a design file is created including a three dimensional design of the shin guard based on the scan of the user's lower leg. The shin guard is then manufactured based on the design file using a rapid manufacturing technique.

B. Specific Examples of the Invention

FIG. 1 generally illustrates an example article of footwear 100 formed according to aspects of the invention. The article of footwear 100 includes an upper 102 and a sole structure 104. The articles and methods described herein references articles of footwear may include any known type of article of footwear, including athletic shoes, such as running shoes, court shoes, soccer shoes, baseball cleats, etc., dress shoes, sandals, and the like. For purposes of reference in the following material, footwear 100 may be divided into three general regions: a forefoot, or toe region 111, a midfoot region 112, and a heel region 113, as identified in FIG. 1. In addition, footwear 100 includes two sides: lateral side 114 and medial side (not shown). Lateral side 114 is positioned to extend along a lateral outer side of the foot and generally passes through each of regions 111-113. Similarly, medial side is positioned to extend along an opposite inner side of the foot and generally passes through each of regions 111-113. Regions 111-113 and the medial and lateral sides are not intended to demarcate precise areas of footwear 100. Rather, regions 111-113 and the medial and lateral sides are intended to represent general areas of footwear 100 that provide a frame of reference during the following discussion.

Generally, upper 102 is secured to sole structure 104 and defines a cavity for receiving a foot. Access to the cavity is provided by an ankle opening 106 located in heel region 113. A lace 108 extends through various apertures in upper 102. Lace 108 may be utilized in a conventional manner to selectively increase a size of ankle opening 106 and modify certain dimensions of upper 102, particularly girth, to accommodate feet with varying dimensions. Various materials are suitable for use in manufacturing a conventional upper. Those materials used in conventional uppers include leather, synthetic leather, rubber, textiles, and polymer foams, for example, that are stitched or adhesively bonded together. The specific materials utilized for upper 102 may be selected to impart wear-resistance, flexibility, air-permeability, moisture control, and comfort. In some conventional arrangements, different materials may be incorporated into different areas of upper 102 in order to impart specific properties to those areas. Furthermore, the materials may be layered in order to provide a combination of properties to specific areas. In accordance with aspects of this invention, the upper 102 may be formed using a rapid manufacturing technique from a thermoplastic elastomer, as will be discussed more fully below.

Sole structure 104 is secured to a lower surface of upper 102 and includes an outsole 120 and a midsole 122. Outsole 120 forms a ground-engaging surface of sole structure 104 and may be formed of a durable, wear-resistant material. Conventional outsole structures 120 may be formed of rubber that is textured or otherwise structured to enhance traction. In accordance with aspects of this invention, the outsole 120 and/or midsole 122 may be formed, using a rapid manufacturing technique, of a thermoplastic elastomer, as will be discussed more fully below. In some embodiments, outsole 120 may be integrally formed with midsole 122 or may be a lower surface of midsole 122. Some conventional midsoles are primarily formed of a polymer foam material, such as polyurethane or ethylvinylacetate, that forms a foam core type impact force attenuation system in the midsole 122. Other conventional midsoles may include a column type midsole impact force attenuation system, such as the one shown in FIG. 1. Additional midsole impact force attenuation members are available for use in conventional midsoles, including fluid-filled bladder type impact force attenuation systems. These various impact force attenuation systems, including column type, foam core, and the like, may also be manufactured using rapid manufacturing techniques and associated materials in accordance with aspects of this invention, and/or may be used in midsoles having portions thereof manufactured using rapid manufacturing additive fabrication techniques and materials according to aspects of this invention, as will be discussed more fully below.

Portions of conventional articles of footwear are generally formed from a variety of different types of materials and a variety of different manufacturing processes. In some arrangements, the upper and sole structure are generally formed as separate pieces and then joined in a post-manufacture processing step. In forming the upper, a plurality of upper portions may be formed or cut, using conventional methods, and then are connected to each other. The upper portions may be connected by any known means such as stitching, adhesives, and the like. This process often includes generation of a substantial amount of waste associated with trimming each of the individual pieces of the upper to be the correct shape and size for that particular upper or portion of the upper.

Figure 2:
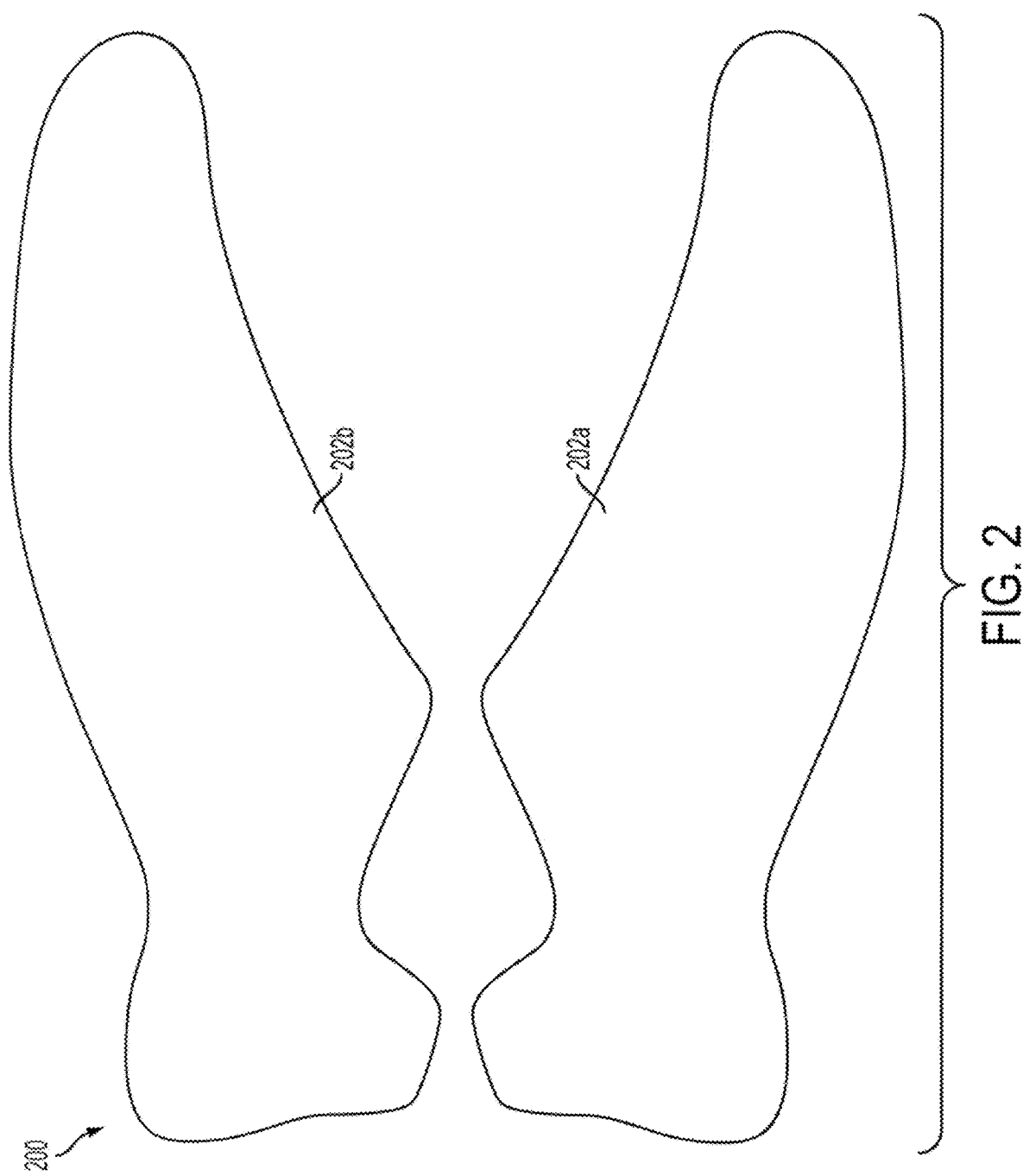
FIG. 2 is a side view of portions of an example shoe upper formed according to this invention.

FIG. 2 illustrates portions of an upper formed according to aspects of this invention described herein. The upper of FIG. 2 is shown as a plurality of upper portions 202a, 202b that are individually formed. According to aspects described herein, each individual upper portion may be formed using a rapid manufacturing additive fabrication technique, such as laser sintering, stereolithography, solid deposition modeling, and the like. Rapid manufacturing fabrication techniques involve creating a three-dimensional design in a data file, such as Computer Aided Design (CAD) file, and building the object of the three-dimensional design in an automated layer by layer process. Essentially, the fabrication equipment reads the three-dimensional design from the data file and lays down successive layers of powder, liquid or sheet material to build the three dimensional object. The layers are joined together by the fabrication equipment, for instance a high powered laser may be used, to form the three dimensional object of the design. Such rapid manufacturing techniques are generally known.

One particular process for forming articles that may be used in accordance with aspects described herein is laser sintering. This process involves creating a three-dimensional design in a data file, such as a CAD file. The laser sintering fabrication equipment reads the CAD file and forms the three-dimensional object of the design, such as an upper or portion of an upper for an article of footwear, using a high powered laser to fuse powders or small particles of plastic, metal or ceramic. First, a layer of powdered material is laid down. Then, the laser is scanned over the powdered layer and is selectively turned on and off to selectively fuse the powdered material at the desired locations for that cross-section of the article being built based on the cross-sections generated from a CAD file. The laser is turned on at the desired locations along the cross-section to fuse the powder at the locations where structure of the article is desired, and the laser is turned off at locations along the cross-sections where no structure is present (the laser need not be physically turned on and off but it simply is, in some manner, exposed to the powder material or masked from the powder material, such as via a shutter, lens system, defocusing system, etc.). After each cross-section is scanned and built, the powder bed is lowered by one layer thickness, a new layer of material is applied on top, and the laser scanning process is repeated until the part is completed. Once the scanning is completed, the final part may be pulled from its powdered surroundings and the unused powder may be reused. Laser sintering and other rapid manufacturing processes are generally known. One example system is found in U.S. Pat. No. 5,156,697 to Bourell et al. and is incorporated herein by reference.

For instance, the individual portions 202a, 202b of the upper 200 of FIG. 2 may be formed layer by layer using a laser sintering technique. That is, a three-dimensional design of the desired upper can be created in a design file, such as a CAD file. The design may include all portions of the upper or just a single portion. In the arrangement of FIG. 2, the upper is shown in two portions 202a, 202b. However, it should be noted that any number of upper portions may be produced and joined to create the desired upper. The individual portions 202a, 202b of the upper are formed to the desired dimensions of the upper. That is, no additional material is included in the final part that may require trimming or other additional processing.

The three-dimensional design created may include any number of regions having different design characteristics. For example, some regions of one or more upper portions may have an increased thickness to provide additional wear resistance and/or support for the wearer. Providing increased thickness in the virtual design will translate into increased thickness in the finally produced upper product. However, the increased thickness will be added in the same manufacturing step as used in creating other portions of the upper, rather than by adding additional upper portions, as was done with conventional uppers. Additionally or alternatively, one or more upper portions may include texture and/or other design elements (such as logos, an individual's name, a team name, etc.) to obtain a desired appearance for the upper. By manufacturing the upper from the virtual file using rapid manufacturing additive fabrication techniques, any number of variations could be made to essentially customize the upper to the specifications or desires of the wearer, without the need for constructing new molds or other retooling steps.

Once the three-dimensional design file is created, a layer of powder may be dispensed (e.g., in a build-up chamber) to form an initial layer of the portion of the upper being created. As mentioned above, the upper could be formed as a single piece in a single, rapid manufacturing step. Alternatively, the upper may be formed as a plurality of upper portions that will be joined together. This plurality of upper portions may also be formed in a single manufacturing step or separately. The layer of powder is selectively exposed to laser radiation to selectively fuse the powder together at the desired locations. Additional layers of powder may be dispensed on top of the initial layer and a high-powered laser may be used to selectively fuse the additional layers of powder material together to form the upper, or portion of the upper, created in the three-dimensional design file. In regions where additional thickness is desired, additional layers of powder will be fused together to add to the thickness of that region, while the powder laid down outside of that region will not be fused and will be removed. For instance, the general thickness of the upper may be between $1/16$ and $3/16$ inch thick. However, the portion or region having increased thickness may include additional material to provide a thickness of between $1/8$ and $5/16$ inch thick. In order to reduce waste, in some arrangements, the powder that is removed can be recovered and reused in a subsequent layer or a later produced product. In some arrangements, 5-95% of the powder may be recovered and reused. In one particular arrangement, 20-80% or even 30-70% of the powder may be recovered and reused.

Once each portion of the upper is complete, the portions may be connected together to form the upper. Known means of connection, such as stitching, adhesives, mechanical connectors and fasteners, and the like can be used to join the individual portions of the upper. Once the individual portions of the upper are joined together, the upper can then be joined to a conventional sole structure or a sole structure formed using a rapid manufacturing technique, as will be described below.

One advantage of using rapid manufacturing techniques for forming articles, such as an upper for an article of footwear, is that there is minimal material waste associated with manufacturing the article. When manufacturing conventional articles, material is often trimmed from the article in order to obtain the desired size or shape of the article. In the method described herein, the three-dimensional design file can be created having the particular desired shape and/or dimensions of the article. The article is then built to those particular shapes and/or dimensions. No additional material is added to the structure that may need to be removed to obtain the desired size and shape of the article.

In addition, creating the upper using rapid manufacturing techniques allows for customization of the upper for each individual upper, if desired. For instance, because each upper is manufactured from a three-dimensional design file for that particular upper, various changes could be made to the file to accommodate each individual user's customization preferences. For instance, a user may request a particular height of the upper or pattern of material on the upper. The design file from which the upper is made can then be created or altered to meet the desires of that particular user. A single upper may be manufactured to these specifications or, alternatively, a plurality of uppers may be manufactured.

In addition, various textures or other design features can be added to the upper based on a user's desires. For instance, a user may desire to have a certain texture added to a toe area of the upper. Alternatively or additionally, the user may desire to have texture added around an ankle portion of the upper on one or both of the medial and lateral sides of the upper. In such a case, the three-dimensional design file from which the upper is built is created or altered to include the desired texture for that specific upper. In some arrangements, the same design file may be used to create a plurality of uppers. Alternatively, a single design file may be used to create a single upper. In this same manner, designs, logos, and/or alphanumeric information may be incorporated into the design and into the final structure of the article.

In some arrangements, properties of the laser used to fuse the particles together may be adjusted to alter the characteristics of the object created. For instance, the laser power, intensity, beam diameter or scanning speed may be adjusted to alter the properties of the object created, e.g., to strengthen the part, to make the part more or less rigid, etc. The laser properties may be adjusted to optimize performance of the article, appearance of the article, speed of production, and the like.

The upper formed using rapid manufacturing technology may be formed using any known material suitable for use in rapid manufacturing processes and sufficiently flexible to form a flexible, bendable article, such as a shoe upper. In some examples, the upper may be formed using a thermoplastic elastomer, such as DuraForm Flex plastic manufactured and sold by 3D Systems, or other similar materials, such as manufactured by Advanced Laser Materials, LLC (e.g., ALM Flex) and Evonk Industries (e.g., Evonik Soft Touch).

In addition, the upper formed using rapid manufacturing additive fabrication techniques described above may also include a urethane resin or other infiltrate. That is, once the upper has been formed, the material may be generally somewhat porous. In order to alter the properties, appearance, and the like of the upper, it may be dipped in, painted with, sprayed with, or otherwise exposed to an infiltrate. The infiltrate will absorb into the material of the upper and fill some or all of the space in the porous material. This process may alter the properties of the upper. For instance, the infiltrate may reinforce the thermoplastic elastomer of the upper to strengthen the upper. In some examples, ST series resins, such as ST-1075 A, ST-3040 A, ST-3052, etc., manufactured by BJB Enterprises, Inc. of Tustin, Calif., may be used to alter the properties of the article.

In addition, the infiltrate may vary in hardness or vary the strength of the upper. For instance, an infiltrate having a hardness in the range of 20-70 Shore A may be used to strengthen the upper. In some arrangements, infiltrate having a hardness ranging from 30-55 Shore A may be used to strengthen the upper (e.g., to provide wear resistance, abrasion resistance, etc.).

In arrangements where various portions of an article of footwear are manufactured using rapid manufacturing additive fabrication techniques, the infiltrate used in the various portions of the article of footwear may vary. For instance, an infiltrate having a higher hardness level may be used in forming a sole structure to provide a more rigid structure, while an infiltrate having a comparatively lower hardness level may be used in forming the upper to provide strength but less rigidity than the sole structure.

In addition to dipping the upper, or other portion of an article of footwear, in an infiltrate to alter the properties of the material, the upper may be dipped in infiltrate under pressure. That is, adding pressure to the dipping process may aid in providing deeper penetration of the infiltrate than arrangements without pressure because a vacuum is created to force the infiltrate into the spaces in the porous upper material.

In some arrangements, the infiltrate used may be clear. In other arrangements, the infiltrate used may include a pigment or a dye to add color to the object dipped in the infiltrate. Such colorants or dyes are generally known.

Once the shoe upper is formed using a rapid manufacturing technique, any desired post-manufacturing processes may be performed on the upper. For instance, in some cases the material used to form the upper may result in the upper being a single, solid color, such as white. Accordingly, the shoe upper may be painted one or more colors to enhance the design or to obtain a desired appearance for the upper. In other arrangements, the layering material used to form the upper may include multiple colors providing different color schemes for a particular upper. If desired, in those cases, portions of the upper still may be painted to further enhance the design. Further, additional coatings may be applied to the shoe upper to provide additional durability, wear resistance, abrasion resistance, traction, and the like.

In addition to using paint to alter the appearance of the upper, the portions of the upper may be joined using a colored adhesive. Such an adhesive may be used with a painted or unpainted upper and may be used to aid in the appearance of the adhesive blending into the aesthetic appearance of the upper while adhering the upper portions. Alternatively or additionally, colored adhesives may be used that are different colors from the color(s) of the upper to further alter the design or to provide a customized appearance of the upper.

In addition to altering the color of the finished article, the article may undergo additional post-processing to alter the appearance of the article. For instance, the article may undergo a sand-blasting or water-jet blasting procedure to provide a rough or worn appearance. Additionally or alternatively, the article may be placed in a tumbler to smooth edges of the article.

In addition to the upper portion of the shoe being formed using rapid manufacturing techniques, the sole portion of a shoe may also be formed using rapid manufacturing techniques. For instance, the sole structure may be formed using techniques such as laser sintering, solid deposition modeling, stereolithography, and the like.

The sole structure of a shoe generally includes a midsole and an outsole. The midsole and outsole may be integrally formed as a single piece, or the outsole may be formed separately from the midsole and joined to the midsole in an additional processing step. In some arrangements, the midsole and outsole may both be formed using rapid manufacturing techniques and may be formed as separate pieces. In another arrangement, the midsole and outsole may be formed as separate pieces and only one of the midsole or outsole may be formed using rapid manufacturing techniques, while the other portion is formed using a conventional technique, such as molding, including injection molding, blow molding, compression molding, vacuum molding, and the like. In yet another arrangement, the midsole and outsole may be integrally formed as a single piece using rapid manufacturing techniques. Using manufacturing methods such as rapid manufacturing additive fabrication techniques results in minimal material waste and the ability to customize the sole structure created.

Figure 3:
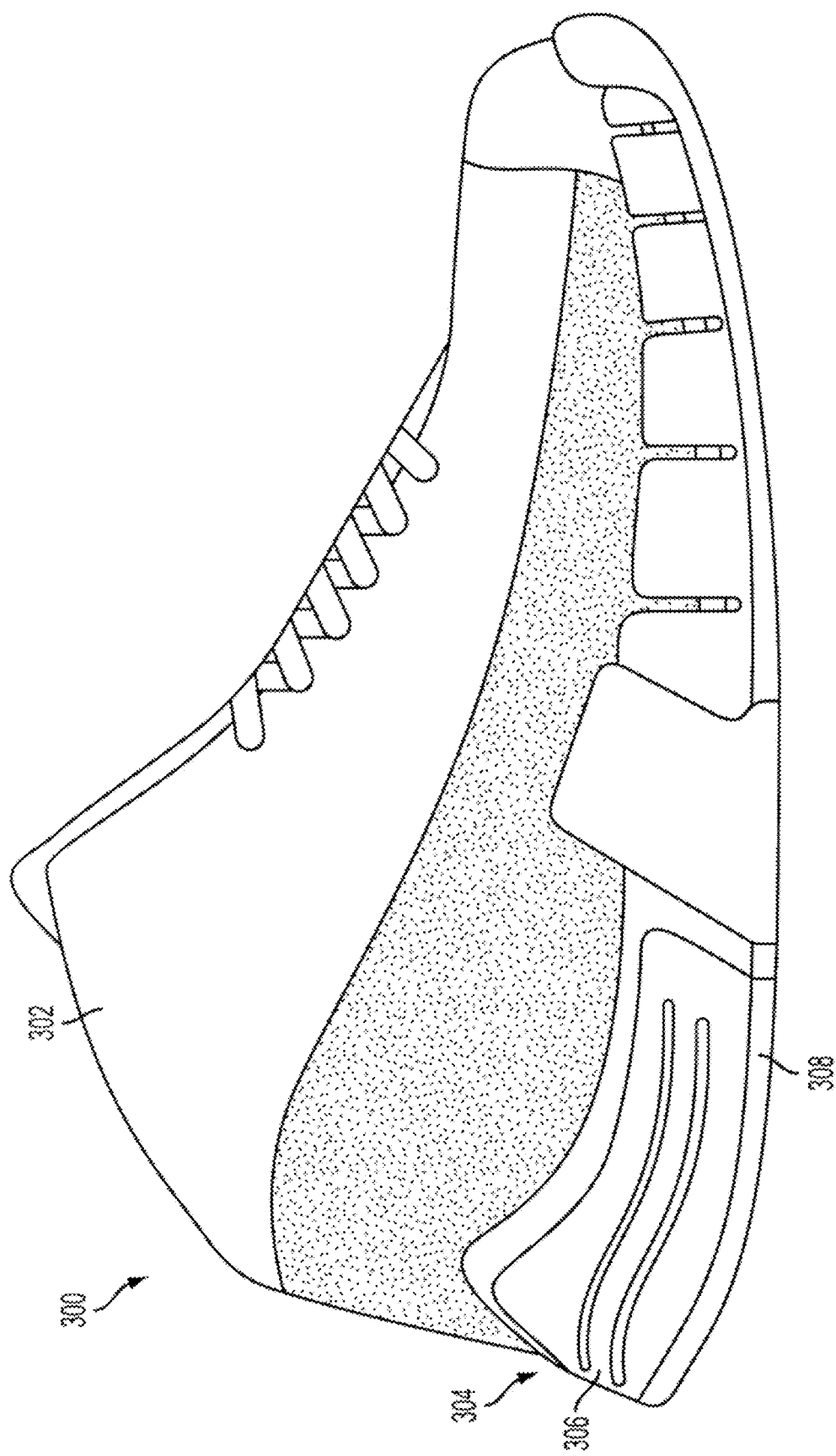
FIG. 3 is a side view of an alternate arrangement of an example article of footwear formed according to aspects of this invention.

FIG. 3 shows one example article of footwear 300 with a sole structure 304 that may be formed using rapid manufacturing techniques. The sole structure 304 includes a midsole 306 and an outsole 308. The midsole 306 further includes a impact force attenuation system. In the arrangement of FIG. 3, the article of footwear 300 includes a foam core type impact force attenuation system. The foam core midsole 306 may be formed using a rapid manufacturing technique. The midsole 306 may be formed from a thermoplastic elastomer, such as DuraForm Flex plastic manufactured and sold by 3D Systems. Additionally or alternatively, the foam core may be formed from a printed foam manufactured using a rapid manufacturing technique.

In addition, the outsole 308 of article of footwear 300 may also be formed using a rapid manufacturing technique, such as laser sintering, stereolithography, solid deposition modeling, and the like. The outsole 308 may be formed of the same material as the midsole 306 (i.e., thermoplastic elastomer, such as DuraForm Flex plastic manufactured and sold by 3D Systems) or may be formed of a material different from that of the midsole. In some examples, the midsole 306 and outsole 308 may be integrally formed as a single piece formed using a rapid manufacturing technique. In other examples, the midsole 306 and outsole 308 may be formed as separate pieces and joined, via known methods of joining, such as stitching, adhesives, mechanical connectors and fasteners, and the like. In these examples, the midsole 306 and outsole 308 may each be formed using a rapid manufacturing technique. In still other examples, the midsole 306 may be formed using a rapid manufacturing technique while the outsole 308 may be formed from a conventional material, (e.g., rubber, plastic, etc.), and formed using conventional methods (e.g., molding, etc.). An alternate arrangement may also be considered wherein the midsole 306 is formed using conventional, non-rapid manufacturing techniques, and the outsole 308 is formed using a rapid manufacturing technique.

As shown in FIG. 3, the thickness of the midsole 306 varies depending on the region of the foot. For instance, the midsole 306 in the heel region (113 in FIG. 1) is thicker than the midsole 306 in the toe region (111 in FIG. 1) to provide increased impact attenuation to the heel region 113 during a heel strike portion of a walking or running motion. This variation in thickness may be included in the three-dimensional design of the midsole 306 when the design file is created. Accordingly, additional layers of material will be selectively fused at the heel region 113 and not at the toe region 111, to provide the increased thickness, and corresponding increased impact attenuation, in the heel region 113. In some arrangements, the heel region of the midsole may be a thickness between ½ inch and 2 inches. However, the toe region of the midsole 111 may have a thickness between ¼ inch and 1 inch. The thickness of the midfoot region (112 in FIG. 1) may be a range of thicknesses to allow for a gradual increase from the thickness of the toe region 111 to the thickness of the heel region 113.

The sole structure of FIG. 3 is joined to an upper 302. The upper 302 may be formed using rapid manufacturing additive fabrication techniques, as discussed above. Alternatively, the upper 302 may be a conventional upper formed using conventional non-rapid manufacturing methods and materials.

With further reference to FIG. 1, the impact force attenuation system shown in article of footwear 100 is a column type impact force attenuation system 115. That is, a plurality of columns 116 is arranged within the midsole 122 in the heel region 113 to provide impact attenuation for the user during walking, running, athletic activities, and the like. In the arrangement of FIG. 1, the sole 104 shown may be formed using a rapid manufacturing technique. For instance, the entire sole structure 104, including the midsole 122, outsole 120 and plurality of impact force attenuation columns 116, may be integrally formed as a single piece from one or more three-dimensional design files. The sole 104 may be manufactured using a rapid manufacturing technique, such as laser sintering, wherein layers of a powder material are selectively fused together based on the three-dimensional design in the design file created in order to produce the desired sole structure. For instance, in the heel region 113, layers of powder may be fused together in regions where the columns 116 are being created. However, the powder that is layered in the void 117 between the columns would not be fused and would be removed and possibly recycled for future use. Such an arrangement minimizes waste associated with the manufacturing process because the sole structure 104 is built in layers to include only the structure, including the desired dimensions, features, etc., included in the design file from which the sole was manufactured. No additional material beyond the desired specifications of the sole structure need be produced.

Alternatively, the various portions of the sole structure may be manufactured individually using a rapid manufacturing technique and the portions formed may then be joined to produce the desired sole structure 104. For example, the sole structure 104 of FIG. 1 may be manufactured in several portions, including a midsole 122, a plurality of impact attenuation columns 116, and an outsole 120. Greater or fewer sole structure components may be formed to ultimately form the sole structure. Each portion of the sole structure 104 may be formed using a rapid manufacturing technique, such as laser sintering, solid deposition modeling, stereolithography, and the like. Once the portions are formed, each portion may be joined to the others, thereby forming the desired sole structure 104. In such an arrangement, the portions may be joined using any known method, such as adhesives, and the like. In still other arrangements, the columns 116 may be formed using conventional manufacturing processes and joined with the midsole 122 and outsole 120 formed using rapid manufacturing techniques.

Figure 4:
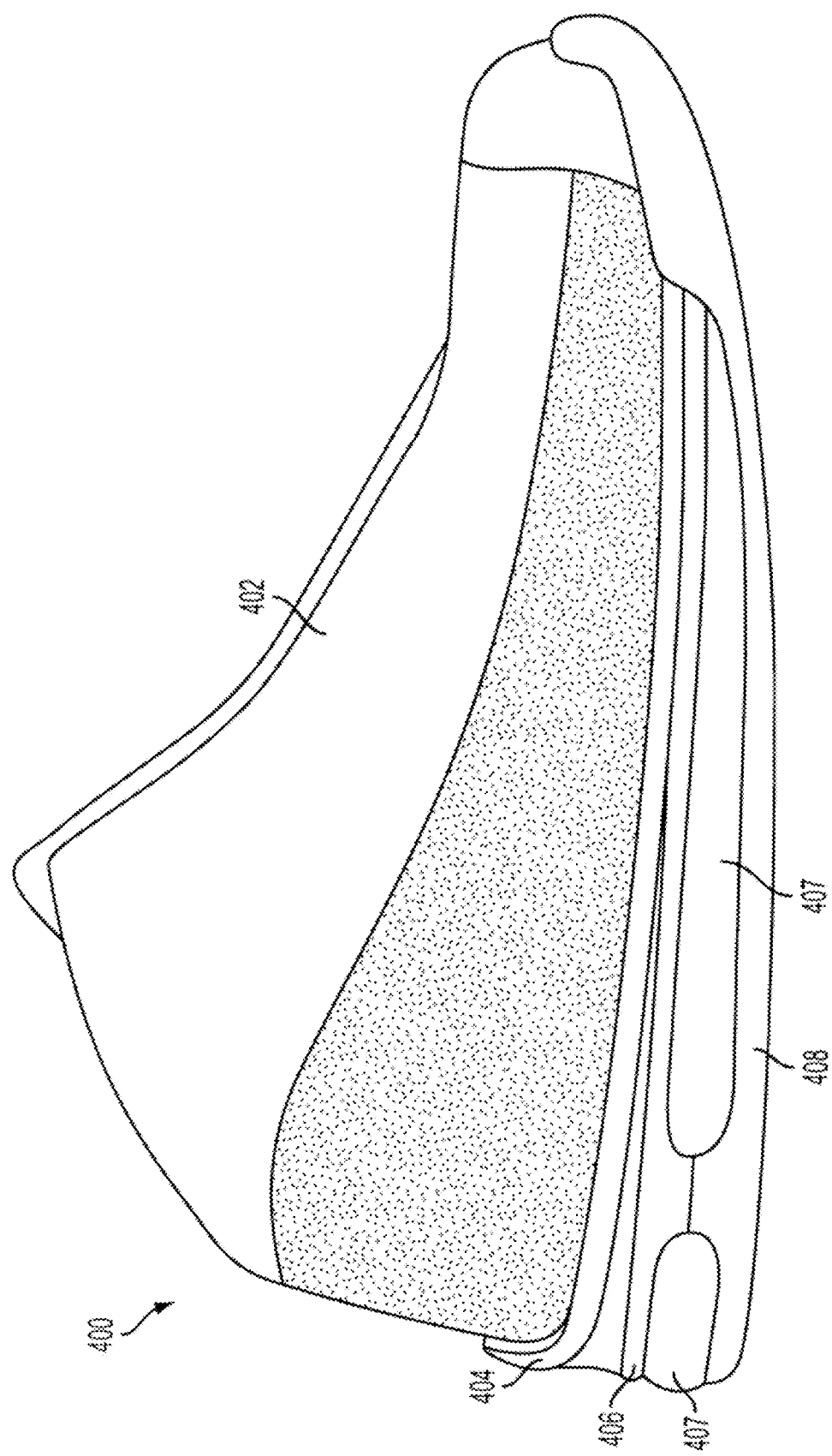
FIG. 4 is a side view of yet another alternate arrangement of an example article of footwear formed according to aspects of this invention.

FIG. 4 illustrates yet another example article of footwear 400 formed according to aspects of this invention. The article of footwear 400 shown includes an upper 402 and a sole structure 404. The upper 402 of the arrangement shown may be formed using a rapid manufacturing technique. At least some portions of the sole structure 404 may also be formed using a rapid manufacturing technique. The sole structure 404 of this example structure includes a midsole 406 including a midsole impact force attenuation system 407, and an outsole 408. The midsole impact force attenuation system 407 shown includes one or more air bags configured to provide impact attenuation during walking, running or other athletic activities. The one or more fluid-filled bladders may be configured in a void formed in the midsole 406. In one arrangement, the various components of the sole structure 404 may be integrally formed as a single piece using a rapid manufacturing technique. In other arrangements, the various sole structure components may be formed separately using a rapid manufacturing technique and joined using any known method of joining such components. In the arrangement of FIG. 4, the midsole 406 and outsole 408 may be formed using a rapid manufacturing technique and the fluid filled bladders forming the midsole impact force attenuation type 407 may be conventional fluid-filled bladders inserted into the midsole 406.

In some arrangements, texture may be added to the sole structure. For example, the outsole 408 may include texture on a bottom side to increase traction for the wearer. Additionally or alternatively, the midsole 406 may include texture along the heel, lateral or medial side to provide a desired aesthetic appearance of the midsole 406. Regardless of the position or type of texture, the texture can simply be added to the design by including the desired texture in the three-dimensional design created in the design file used to produce the sole using rapid manufacturing. Logos, alphanumeric information and other design features can also be added to the sole structure 404 in a similar manner.

Figure 5A:
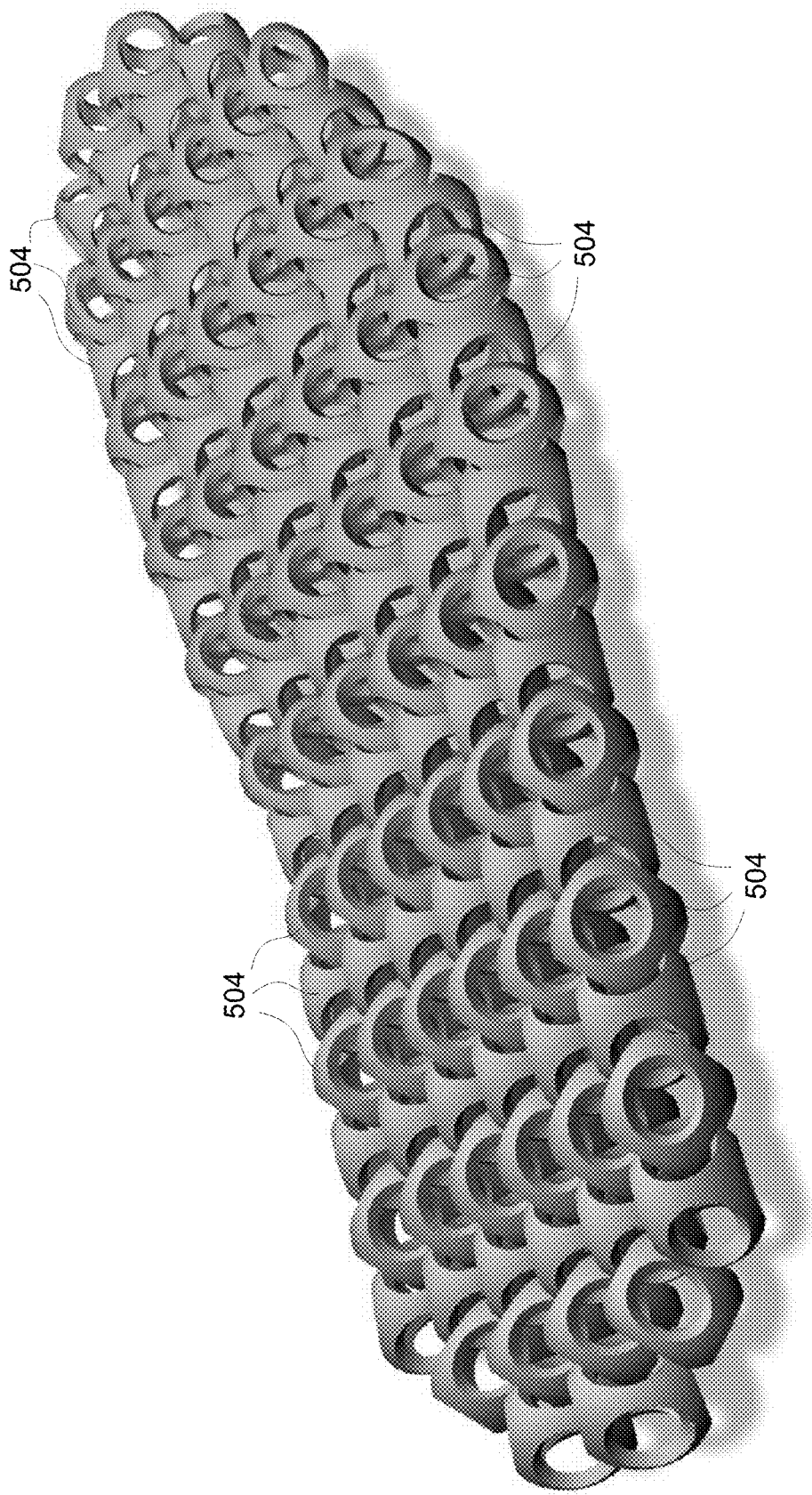
FIGS. 5A-5C illustrate an example midsole impact force attenuation system having interlocking links and formed according to aspects of this invention.
Figure 5B:
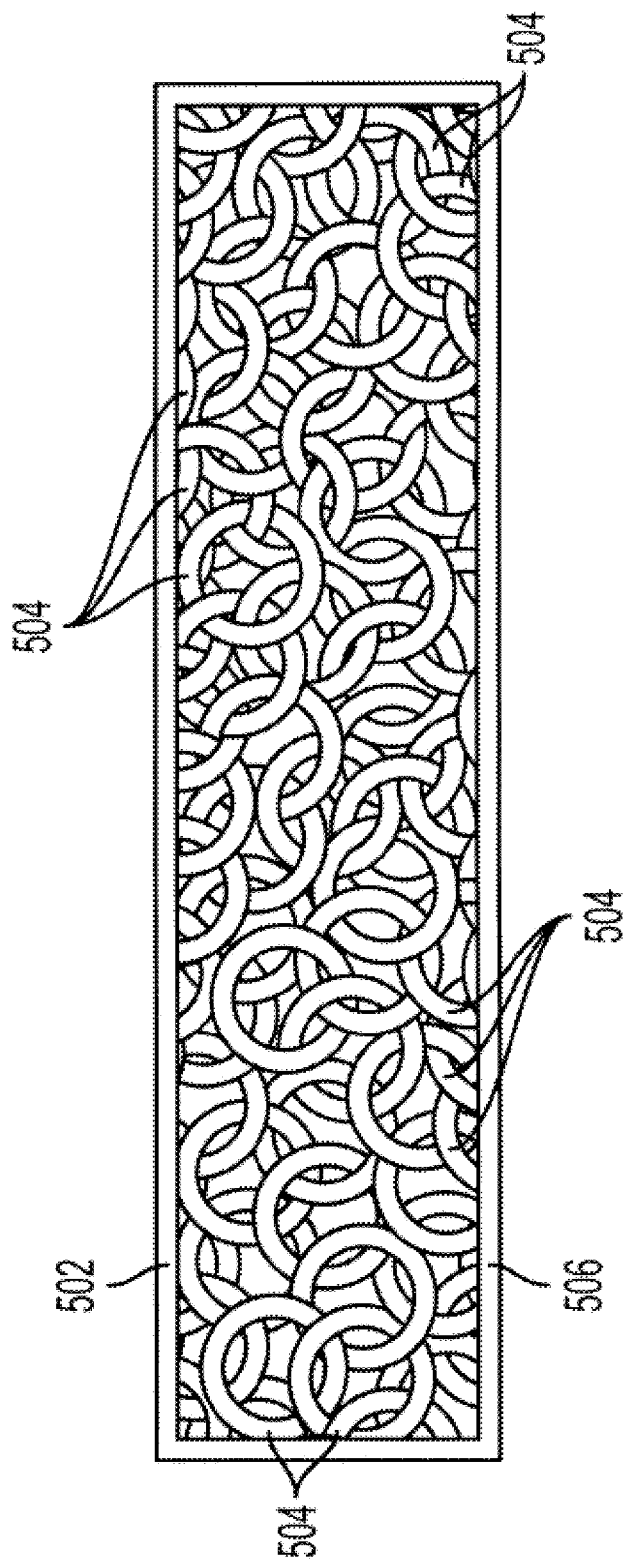

Another advantage of the use of rapid manufacturing to manufacture wearable articles is that rapid manufacturing allows for complex designs to be economically and efficiently manufactured. For instance, use of rapid manufacturing in the manufacture of footwear allows for production of soles having configurations that may be difficult or impossible to construct using conventional sole manufacturing methods. For example, FIGS. 5A and 5B depict an alternate arrangement of a sole structure that may be manufactured in accordance with aspects described herein. The sole structure shown may be manufactured, in whole or in part, using a rapid manufacturing technique, such as laser sintering, solid deposition modeling, stereolithography, and the like. The sole structure shown includes a midsole housing 502 containing the midsole impact force attenuation system. The midsole housing 502 may be configured to provide support for the foot of the wearer and for the midsole impact force attenuation system. In the arrangement shown, the midsole impact force attenuation system comprises plurality of interlocking links 504. The interlocking links 504 generally act as an impact attenuation component of the sole structure. The interlocking links 504 provide impact force attenuation to the foot of the wearer and distribute the force associated with the foot of the wearer hitting the ground during a walking or running movement. The complex structure of the interlocking links may be costly and/or time consuming to produce (or even impossible to produce) using conventional manufacturing methods. However, rapid manufacturing allows the interlocking links arrangement to be produced in a relatively quick and cost effective manner. The interlocking links are simply included in the three-dimensional design created in the design file and the structure is built using the layer-by-layer process described above.

The sole structure also includes an outsole 506 that may be integrally formed with the midsole housing and interlocking links of the midsole impact force attenuation system. Alternatively, the outsole may be manufactured as a separate portion of the sole structure. One advantage of manufacturing the various portions or components of the sole structure using a rapid manufacturing technique is that it allows the different components or the entire sole structure to be formed using a single process and the components can be formed having varying thicknesses, textures, etc.

Figure 5C:
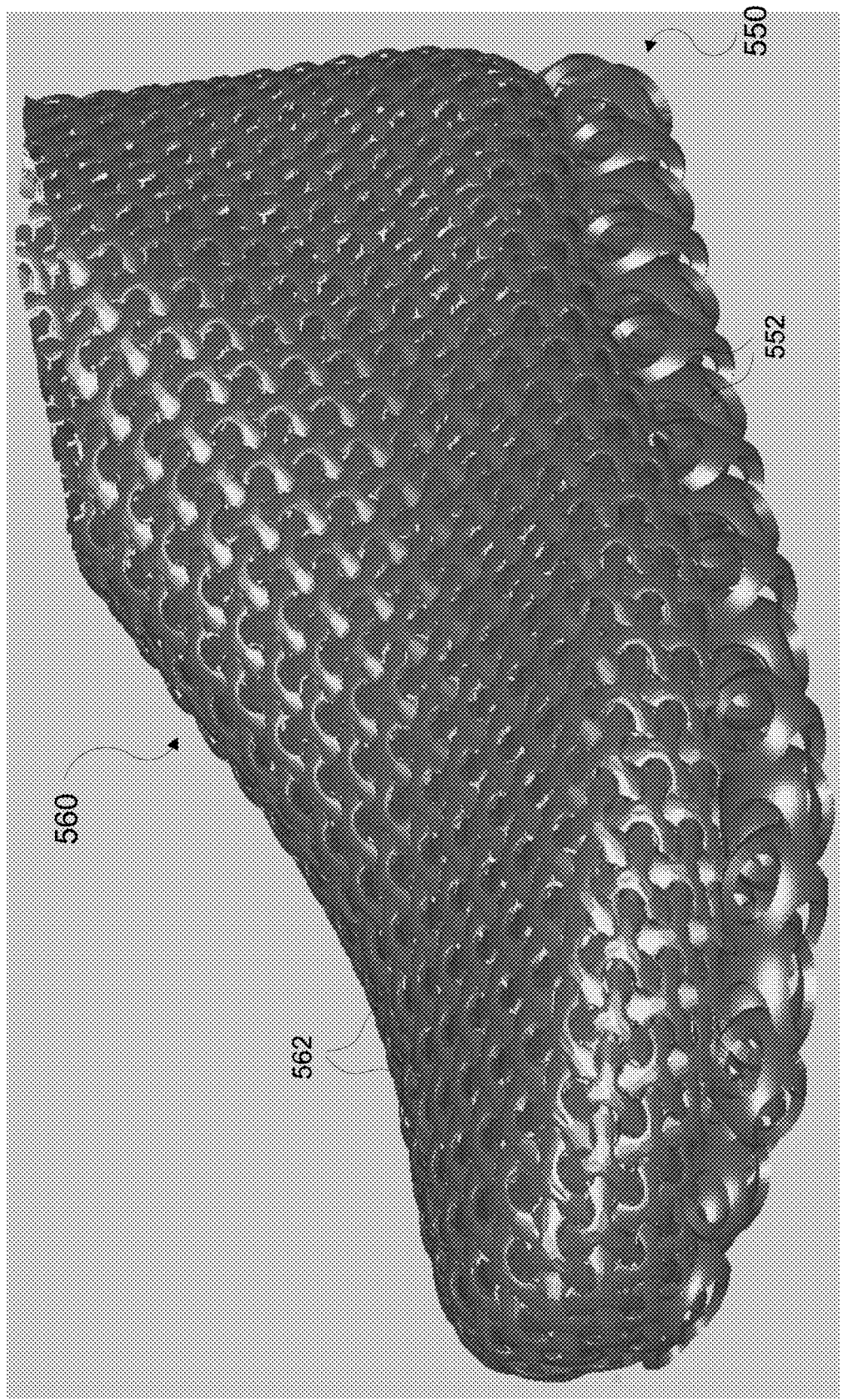

In some arrangements, the sole structure may include the interlocking links 504 without the use of a midsole housing 502, as shown in FIG. 5C. If desired, an outsole 506 may be manufactured as part of the interlocking links 504 using the rapid manufacturing additive fabrication technique, or the outsole 506 may be formed separately and connected to the interlocking links 504 using known methods of attachment, such as adhesives, stitching and the like. As another more specific example, the interlocking link structure may "morph" into a more conventional appearing outsole structure.

In some arrangements, the interlocking links 504 shown in FIGS. 5A and 5B may form the entire article of footwear, as shown in FIG. 5C. That is, the sole structure 550 may be formed of interlocking links 552 and the upper 560 may also be formed of interlocking links 562. The upper 560 and sole structure 550 may be formed in a single rapid manufacturing process or may be formed separately and joined upon completion of each portion. In some arrangements, the size, thickness, configuration, etc. of the interlocking links 552, 562 may be different on the sole structure 550 than on the upper 560. For instance, the sole structure 550 may include interlocking links 552 and the upper 560 may include smaller, thinner interlocking links 562 that will provide additional protection to the foot of the wearer from rain, debris, and other environmental factors. Alternatively, the sole structure 550 may have smaller interlocking links than the upper 560. In still other arrangements, the interlocking links of the upper 560 and sole structure 550 may vary in different regions of the upper or sole structure to provide additional impact attenuation, support, etc. for the foot of the wearer.

In some arrangements, the three-dimensional design of the wearable article being produced can be created based on a scan of a wearer's body part. For instance, the feet of a user may be scanned to obtain information regarding the physical characteristics of the foot (e.g., width, length, thickness, arch, location, arch height, heel curvature, etc.). A three dimensional design of the desired article may be created in a design file, such as a CAD file, based on the scan. The CAD file created from the scan may then be used to create the article using a rapid manufacturing technique and the article created may be a customized shoe designed and configured to fit the exact characteristics of the foot of the user. Systems used for such scanning are generally known in the art. For example, U.S. Pat. No. 5,880,961 to Crump describes one such method and is incorporated herein by reference.

Although the following example will be described with respect to footwear, it should be recognized that a similar method and process may be used to scan various body parts of a wearer body to produce any of a variety of articles, including apparel, watchbands, eyeglasses, athletic equipment, and the like.

Figure 6:
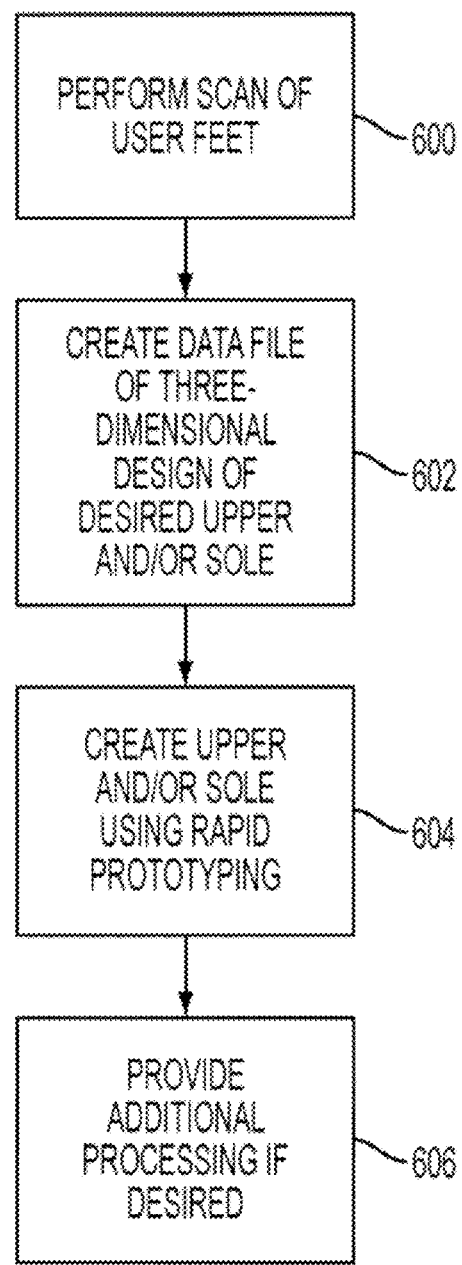
FIG. 6 is a flow chart depicting one example method of forming an article of footwear according to aspects of this invention.

FIG. 6 is a flow chart illustrating one example method of producing an article of footwear. In step 600, a scan is performed of a user's feet. The scan may be performed using known methods, computer systems, and software, e.g., as described above. The scan is performed to obtain various physical characteristics of the foot of the wearer in order to design a customized shoe configured to fit the specifications and characteristics of the user's foot. From the scan, a three-dimensional design of the desired article of footwear is created in a data file, such as a CAD file, as shown in step 602. Once the design file is created, the article of footwear is created using a rapid manufacturing technique in step 604. For instance, the upper and/or sole may be produced using laser sintering. The layer-by-layer manufacturing process allows the upper and/or sole to be created to the specifications of the design file. The article of footwear produced is manufactured and configured to fit the physical characteristics of the user's foot obtained during the scan. In step 606, any additional desired processing is performed on the article of footwear. For example, the upper may be painted or exposed to one or more infiltrates to provide the desired appearance and/or characteristics of the upper. Such methods can be particularly useful for providing comfortable and custom fitted footwear to user's that have somewhat different-sized feet.

Figure 7:
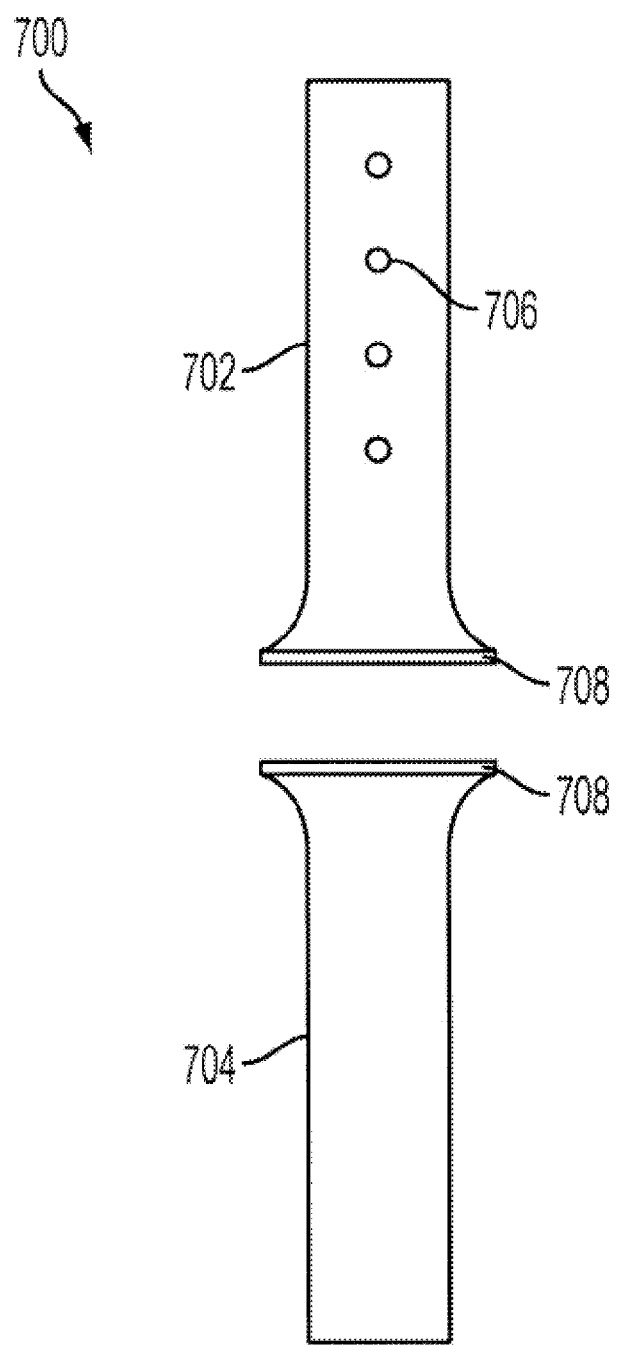
FIG. 7 is a top view of an example watchband formed in accordance with aspects of this invention.

Although many examples discussed above have been directed to articles of footwear and the manufacture thereof, aspects of this invention may be used with the manufacture of a variety of wearable articles, including apparel, watchbands, athletic equipment, eyeglasses and the like. For instance, FIG. 7 illustrates one example watchband 700 that may be manufactured using aspects of this invention. The watchband 700 generally includes a first strap 702 and a second strap 704. The first strap 702 may include a plurality of apertures 706 through which a stem of a closure portion may protrude. The first and second straps 702, 704 of the watchband 700 may each include an aperture extending widthwise across the strap arranged at an inside end 708 of each strap 702, 704. The aperture may be configured to receive a pin or other retaining device that can be used to join the straps 702, 704 to the face (not shown). Similar apertures may also be arranged at a far end of the strap 704 for engaging the buckle member. The watchband 700 shown may be formed using a rapid manufacturing technique, such as laser sintering, solid deposition modeling, stereolithography, and the like. That is, a three-dimensional design of the watchband 700 is created in a design file, such as a CAD file and the watchband 700 is manufactured from the design file using a layer-by-layer rapid manufacturing method, such as described above. The apertures 706 for receiving the closure stem and the apertures for receiving the retaining pin are included in the three-dimensional design and are thereby constructed in the rapid manufactured final product.

Figure 8:
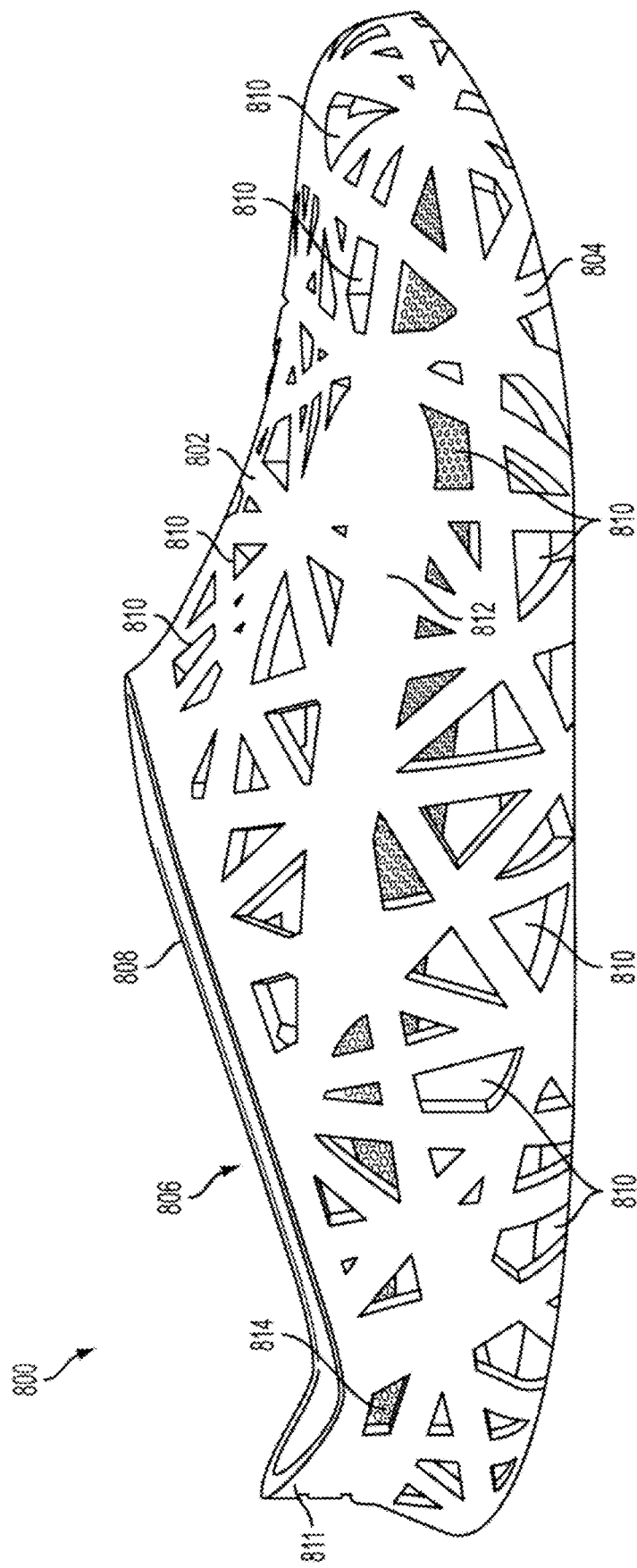
FIG. 8 is a side view of an example article of footwear formed according to aspects of the invention described herein.
Figure 9:
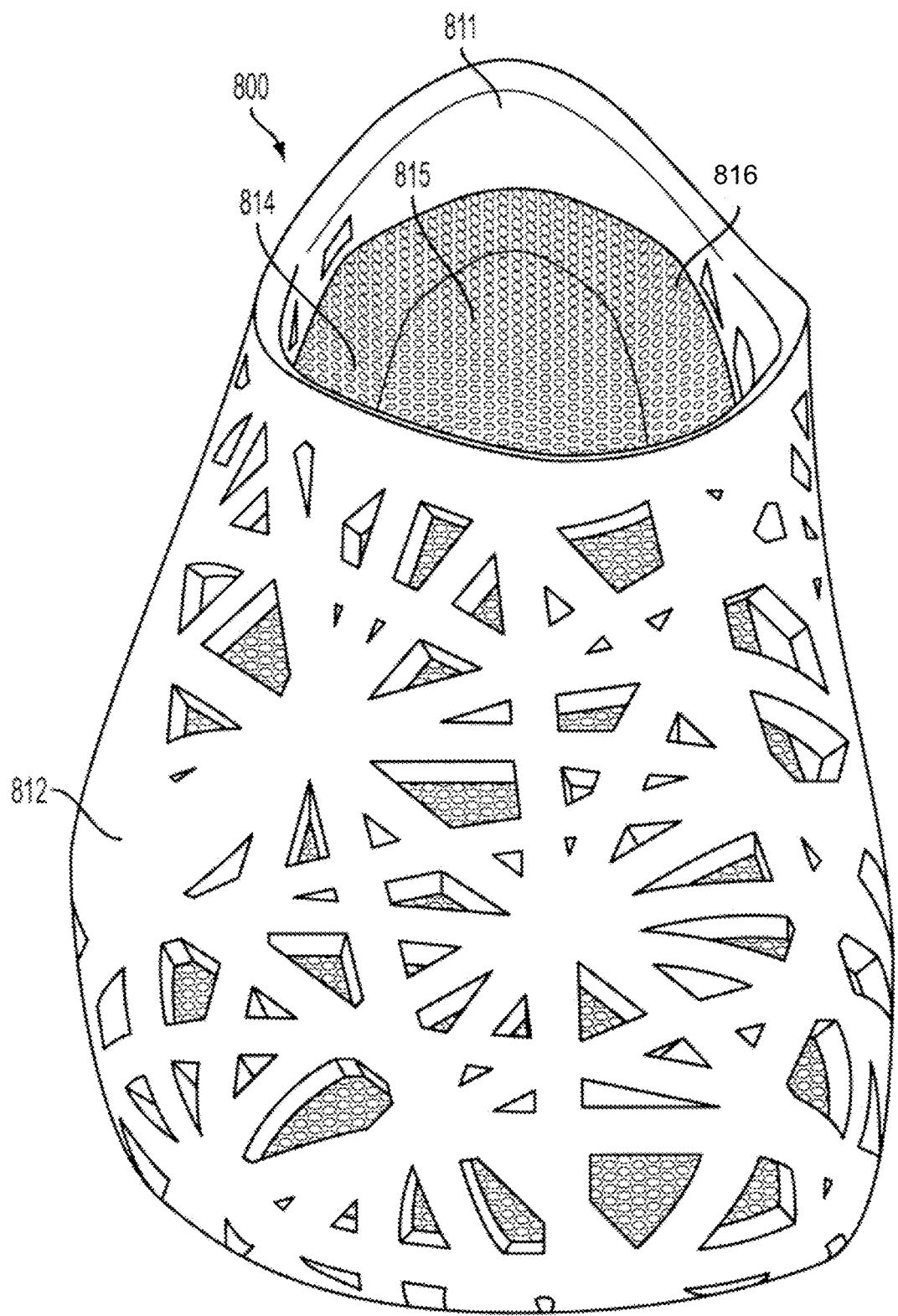
FIG. 9 is a front perspective view of the article of footwear of FIG. 8.
Figure 10:
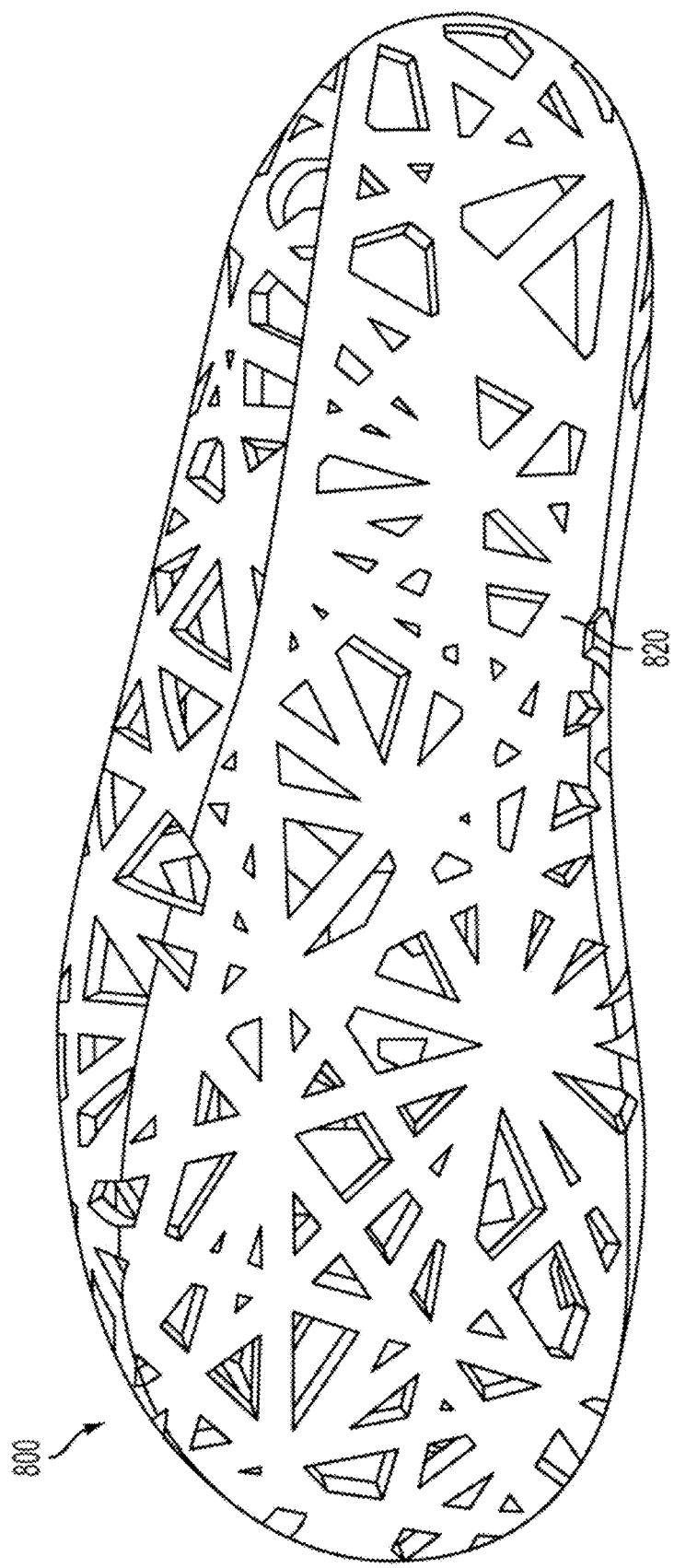
FIG. 10 is a bottom view of the article of footwear of FIG. 8.

FIGS. 8 through 10 illustrate yet another example article of footwear 800 that may be formed according to aspects described herein. The article of footwear 800 shown may be formed using a rapid manufacturing technique or rapid manufacturing additive fabrication technique, such as laser sintering, solid deposition modeling, stereolithography, and the like. As described above, a computer data file may be created including the article of footwear shown. The article 800 may then be manufactured in an additive process wherein, for instance, a powder is fused together in various regions in a layer-by-layer process to form the article 800. This manufacturing technique provides the capability to manufacture complex shapes, patterns, etc. that might be difficult or impossible using conventional manufacturing techniques, such as molding.

The article of footwear 800 generally includes an upper region 802 and an outsole region 804. In the arrangement shown, the upper region 802 and outsole region 804 are formed as a single continuous piece. For instance, the upper 802 and outsole 804 may be formed as a unitary member wherein no distinct separation is found between the upper 802 and the outsole 804. In other arrangements, the upper 802 may be joined with a conventional outsole or, alternatively, the outsole 804 of FIG. 8 may be joined with a conventional upper.

The upper region 802 includes an ankle opening 806 through which the foot of a wearer is inserted. The ankle opening 806 may be sized to accommodate a variety of foot sizes. Additionally or alternatively, a collar area 808 of the opening may be configured to stretch to accommodate the foot of the wearer. The upper region 802 of the article of footwear 800 may be configured to fit snugly around the foot of the wearer to aid in holding the shoe 800 on the foot of the wearer. In some arrangements, the upper 802 may stretch to conform to the foot of the wearer to accommodate variations in size of the foot.

The article of footwear 800 may be formed of any suitable material, such as a thermoplastic elastomer that may be used in a rapid manufacturing additive fabrication technique. The material from which the article of footwear 800 is formed may be selected for properties such as flexibility, wear resistance, water resistance, and the like.

The article of footwear 800 includes a plurality of apertures 810 formed in the upper 802 and outsole 804 regions. The apertures 810 may aid in providing ventilation and flexibility for the article of footwear 800 and may reduce weight associated with the article of footwear 800. The apertures 810 may be formed randomly, i.e., in a non-repeating pattern. Additionally or alternatively, the apertures 810 may be formed in a repeating pattern. In one arrangement, the article of footwear 800 may include apertures 810 formed in a pattern particular to a user. For instance, a computer data file may be created including an article of footwear 800 having apertures 810 distributed throughout the upper and outsole regions in a pattern selected by or determined for a particular user. The article of footwear 800 may then be created using layer-by-layer processes, such as laser sintering, solid deposition modeling, stereolithography, and the like, to create the article of footwear 800 created in the data file. That particular pattern may be used only for that particular user, if desired. This provides a cost effective method of creating shoes with customized aperture patterns for individual users. Additionally or alternatively, the data file created may be used to create a plurality of articles of footwear having the same aperture pattern.

The apertures 810 formed in the article of footwear 800 may include apertures 810 of various shapes and sizes. In one arrangement, the apertures 810 may be straight sided apertures in the shape of regular or irregular polygons. For instance, the article of footwear 800 may include apertures 810 that are square, rectangular, trapezoidal, triangular, hexagonal, octagonal and the like. Circular apertures may also be included. In addition, the apertures 810 may have irregular shapes including shapes with unequal sides, etc. The arrangement of apertures 810 in the article of footwear 800 shown was inspired by the Bird's Nest stadium of the 2008 Beijing Olympics. Manufacturing the article 800 using a rapid manufacturing additive fabrication technique provides virtually limitless opportunities for variety in aperture shape because any shape that can be created in the data file can be built using the layer-by-layer process associated with the technique.

The apertures 810 formed may also vary in size. In some arrangements, the apertures 810 may be the same size or similar size throughout the upper 802 and outsole 804 regions of the article of footwear 800. In other arrangements, the apertures 810 may be sized similarly throughout the upper region 802 but may vary in size in the outsole region 804. Any combination of aperture shape and size may be formed in the article of footwear 800.

One advantage to forming the article of footwear 800 using a rapid manufacturing additive fabrication technique is minimization of waste. In conventional shoes having a plurality of apertures, material may have to be trimmed from the article after a molding process is complete or the apertures may have to be cut from the article of footwear (e.g., using a die-cutting procedure). In the arrangement shown, substantially all of the material used in the manufacture of the shoe 800 is that shown on the shoe 800. Any powder or loose material that is not fused to other material to form the shoe 800 may be removed during or after the manufacturing process and recycled, thereby minimizing the amount of waste associated with the manufacture of each article of footwear 800.

The article of footwear 800 may also include one or more logo regions 812. The logo region 812 may be integrally formed on any suitable side or surface of the article of footwear 800. In some arrangements, the logo may be formed in the shoe 800 during the rapid manufacturing additive fabrication process. In other arrangements, the logo may be added to the logo region 812 of the shoe 800 after the shoe has been produced. When separately added to the shoe design, the logo may be connected to the shoe 800 using known means of connection, such as adhesives, stitching, mechanical connectors and fasteners, and the like.

The article of footwear 800 may also include a comfort enhancing element 814. The comfort enhancing element 814 will provide additional impact attenuation and flexibility for the wearer. With reference to FIG. 9, comfort enhancing element 814 may be formed using a rapid manufacturing additive fabrication technique, such as laser sintering, stereolithography, solid deposition modeling, and the like. The comfort enhancing element 814 may be integrally formed with the article of footwear 800, or it may be separately formed using the rapid manufacturing additive fabrication technique. In some arrangements, the comfort enhancing element 814 may be a conventional comfort enhancing element (e.g., a footwear insole element, a sock liner, a fluid-filled bladder, etc.) formed using conventional manufacturing techniques, such as molding, sewing, and the like. The article of footwear 800 may be used with the comfort enhancing element 814 and, in some arrangements, may be worn without the comfort enhancing element 814, as shown in FIG. 10.

The comfort enhancing element 814 may include a top surface 816 configured to provide traction for the foot of the wearer. For instance, the top surface 816 of the element 814 may include texture, such as grooves, ribs, nubs, and the like, to aid in maintaining the position of the foot within the article of footwear 800. In addition, the comfort enhancing element 814 may be formed of materials having anti-bacterial and/or anti-microbial characteristics to aid in preventing odor.

In addition, if desired, the comfort enhancing element 814 may include a logo region 815. In some arrangements, the logo may be integrally formed in the element during the rapid manufacturing additive fabrication technique used to create the comfort enhancing element 814. In arrangements in which a conventional comfort enhancing element is used, the logo may be molded in or may be a separate piece connected to the element using known means of attachment, such as adhesives, stitching, mechanical connectors, and the like.

In some arrangements, the heel region 811 of the article of footwear 800 may include apertures similar to the apertures 810 formed in the upper and outsole regions. In other arrangements, such as the arrangement of FIGS. 8 and 9, the heel region 811 may be formed as a solid region. This solid region may provide additional support to the heel region 811 and may aid in holding the shoe on the foot of the wearer. In still other arrangements, however, if desired, the article of footwear 800 may include a heel or ankle strap (not shown) to aid in holding the shoe 800 on the foot of the wearer.

The bottom surface 820 of the article of footwear shown in FIG. 10 may include apertures, similar to the upper 802 and outsole 804 regions of the article of footwear 800. In some arrangements, the pattern of apertures on the upper region 802 may be repeated on the bottom surface 820 of the article of footwear. In other arrangements, the bottom surface 820 may include a pattern different from the pattern of apertures 810 formed in the upper region 802 and the outsole region 804 (e.g., if necessary and/or desired to provide additional traction, durability, and/or wear resistance). The bottom surface 820 also may be made somewhat thicker, e.g., to enhance wear resistance.

In some arrangements, the bottom surface 820 of the article of footwear 800 may be generally flat and/or void of any type of traction elements, such as grooves, ridges, nubs and the like, as shown in FIG. 10. In other arrangements, however, the bottom surface 820 may include such traction elements. These traction elements may be formed in the bottom surface 820 of the article of footwear 800 through the rapid manufacturing additive fabrication technique used to form the article of footwear 800. For instance, in creating the data file from which the article of footwear 800 will be formed, various traction elements may be included in the bottom surface 820 of the shoe 800. Those traction elements will then be formed in the bottom surface 820 through the layer-by-layer process associated with the rapid manufacturing additive fabrication technique used to form the shoe 800. Alternatively, if desired, separate traction elements, such as rubber elements, may be attached to the bottom surface 820 and function as traction elements.

As discussed above, various post-manufacturing processes may be performed on the article of footwear 800. For instance, the article of footwear may be painted to provide a unique design or color scheme on the shoe 800. Additionally or alternatively, various reinforcements may be connected to the shoe 800 to provide additional support, wear resistance and/or design elements to the shoe 800. As some more specific examples, a heel counter, arch support, edge reinforcing elements, or other structures may be incorporated into the footwear structure 800.

In addition to the advantages described above, use of rapid manufacturing additive fabrication techniques may permit a manufacturer to maximize build volume in order to reduce costs, manufacturing time, etc. For instance, the layer-by-layer processes described above may be used to manufacture small parts within a hollow portion of larger parts being manufactured. For instance, in manufacturing a shoe upper, a CAD file will be created including the design of the upper. In addition, the CAD file may include a design of a watch band within the void created by the shoe upper.

During the manufacturing process, the upper will be produced using the layer-by-layer process to fuse particles of the upper. In addition, the laser will fuse particles associated with the watch band within the void created by the upper. When the process is complete, any particles not fused will be removed and recycled when possible and the watch band and upper will remain as separate parts. In this same manner, a separate comfort enhancing element, such as element 814, may be rapid manufactured within the shoe structure without requiring connection between the comfort enhancing element and the shoe structure. This arrangement optimizes the manufacture of articles because two articles may be created in one process. In some arrangements, several different articles may be manufactured within another article using the rapid manufacturing additive fabrication technique.

CONCLUSION

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

I claim:

1. A method of constructing an article of footwear, comprising:
    forming a multilayer upper of the article of footwear, the multilayer upper including at least a medial side portion and a lateral side portion, comprising:
        forming a first layer of the multilayer upper by depositing thermoplastic elastomer material in a shape of the multilayer upper using a solid deposition modeling technique, and
        forming a second layer of the multilayer upper by depositing thermoplastic elastomer material into the shape of the multilayer upper and onto the first layer of the multilayer upper using the solid deposition modeling technique, bonding the second layer to the first layer,
    wherein the deposited first layer and second layer collectively comprise a unitary upper formed by the solid deposition modeling technique.

2. The method of claim 1, wherein forming the multilayer upper further comprises forming a texture along at least a portion of the multilayer upper.

3. The method of claim 1, further comprising forming the multilayer upper according to a user-customized three-dimensional design specified in a design file, and wherein at least one dimension of the multilayer upper specified in the design file corresponds to data derived from a scan of a user's foot.

4. The method of claim 1, wherein the thermoplastic elastomer material forming the first layer has a different color from a color of the thermoplastic elastomer material forming the second layer.

5. The method of claim 1, wherein forming the multilayer upper includes forming a plurality of apertures in one or more portions of the multilayer upper.

6. The method of claim 5, wherein the thermoplastic elastomer material forming the first layer has a different color from a color of the thermoplastic elastomer material forming the second layer.

7. The method of claim 1, wherein forming the multilayer upper further comprises disposing a logo region at a portion of the multilayer upper.

8. The method of claim 7, wherein disposing the logo region comprises integrally forming the logo region while forming the multilayer upper by the solid deposition modeling technique.

9. The method of claim 1, further comprising connecting a reinforcement to the multilayer upper.

10. The method of claim 9, wherein the reinforcement comprises edge reinforcing elements.

11. The method of claim 1, wherein the multilayer upper forms a foot insertion opening.

12. The method of claim 1, further comprising exposing the multilayer upper to an infiltrate so that the infiltrate absorbs into the multilayer upper.

13. The method of claim 12, wherein the infiltrate increases a hardness or strength of the upper.

14. The method of claim 12, wherein the exposing takes place under vacuum pressure.

15. The method of claim 1, wherein forming the multilayer upper includes forming a plurality of apertures in one or more portions of the multilayer upper, wherein the thermoplastic elastomer material forming the first layer has a different color from a color of the thermoplastic elastomer material forming the second layer, and wherein the method further includes:
    engaging a sole structure with the multilayer upper.

16. The method of claim 15, wherein the sole structure includes a midsole.

17. The method of claim 15, wherein the sole structure includes a fluid-filled bladder.

18. The method of claim 15, wherein the sole structure comprises a foam material.

19. The method of claim 15, wherein the sole structure includes a midsole and an outsole engaged with the midsole.

20. The method of claim 15, wherein engaging the multilayer upper with the sole structure includes adhesively bonding the multilayer upper to the sole structure.

* * * * *